United States Patent [19]

Ames et al.

[11] 4,155,309

[45] May 22, 1979

[54] CONVERTIBLE RAIL-HIGHWAY TRACTION VEHICLE CONTROL CAB

[75] Inventors: Victor H. Ames; Marshall V. Hartelius, both of Midlothian, Ill.

[73] Assignee: Whiting Corporation, Harvey, Ill.

[21] Appl. No.: 854,086

[22] Filed: Nov. 23, 1977

Related U.S. Application Data

[60] Division of Ser. No. 552,711, Feb. 24, 1975, Pat. No. 4,067,259, which is a continuation-in-part of Ser. No. 437,283, Jan. 28, 1974, Pat. No. 3,884,156.

[51] Int. Cl.$^2$ ................... B61C 17/04; B61C 17/12; B61D 49/00; B61K 13/00
[52] U.S. Cl. .................................. 105/456; 105/342
[58] Field of Search ................... 105/26 R, 26.1, 90 A, 105/342, 456

[56] References Cited

U.S. PATENT DOCUMENTS

| 1,851,468 | 3/1932 | Townsend | 105/343 X |
|---|---|---|---|
| 3,182,605 | 5/1965 | Brasher | 105/456 X |
| 3,238,896 | 3/1966 | Minenko et al. | 105/26 R |
| 3,399,633 | 9/1968 | Herscovitch | 105/26.1 |
| 3,884,156 | 5/1975 | Ames et al. | 105/26 R X |
| 4,067,259 | 1/1978 | Ames et al. | 105/26 R |
| 4,067,259 | 1/1978 | Ames et al. | 105/26 R |

FOREIGN PATENT DOCUMENTS

| 743528 | 1/1933 | France | 105/456 |
|---|---|---|---|
| 915334 | 1/1963 | United Kingdom | 105/456 |

*Primary Examiner*—Albert J. Makay
*Assistant Examiner*—Howard Beltran
*Attorney, Agent, or Firm*—Lockwood, Dewey, Alex & Cummings

[57] ABSTRACT

A weight transfer rail traction vehicle adapted for travel on alternate sets of rail or road wheels which is characterized by a number of features including: a spring and shock absorber system which cooperate to maintain the springs, while in a rail travel mode, in an active condition despite substantial weight transfer loads being placed thereon; a hydraulic system which enables the differential axles to be optionally spring supported to the frame or in a rigid fixed relationship therewith; a differential axle suspension system wherein the spring supported axle moves in a substantially vertical plane without lateral shifting; a shock absorbing coupler; a coupler mounting arrangement which includes a coupler carriage directly mounted to a lateral frame member of the vehicle which serves as a guideway for directing travel of the coupler carriage and hence the coupler mounted thereto in a horizontal direction and wherein the coupler itself is mounted for vertical movement with respect to the coupler carriage; a self-centering and self-adjusting rail wheel brake system; and, a multiple rail driving station cab which utilizes only a single set of controlsto enable the operator to drive the vehicle in a rail travel mode from the particular location in the cab which affords him maximum visibility.

2 Claims, 24 Drawing Figures

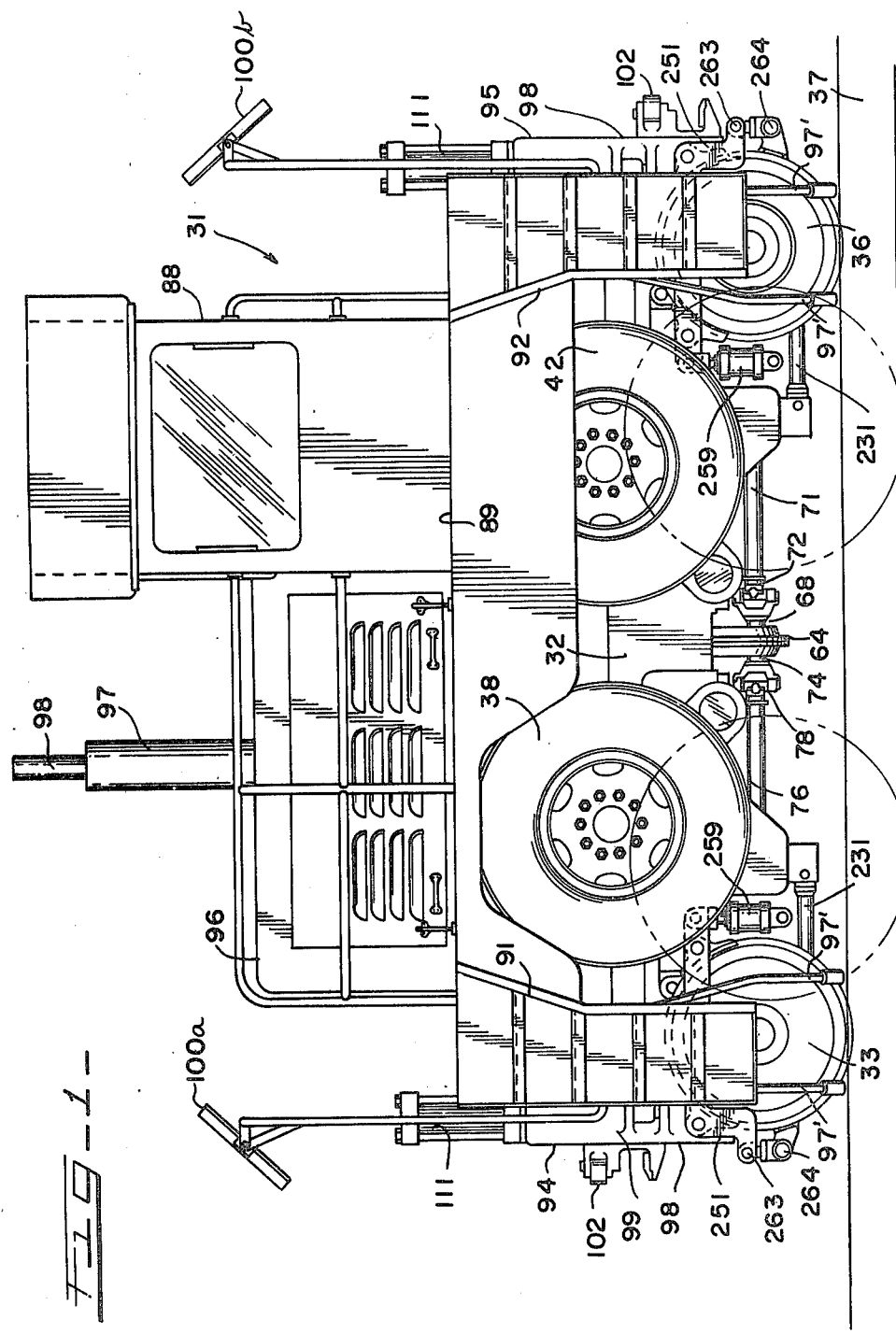

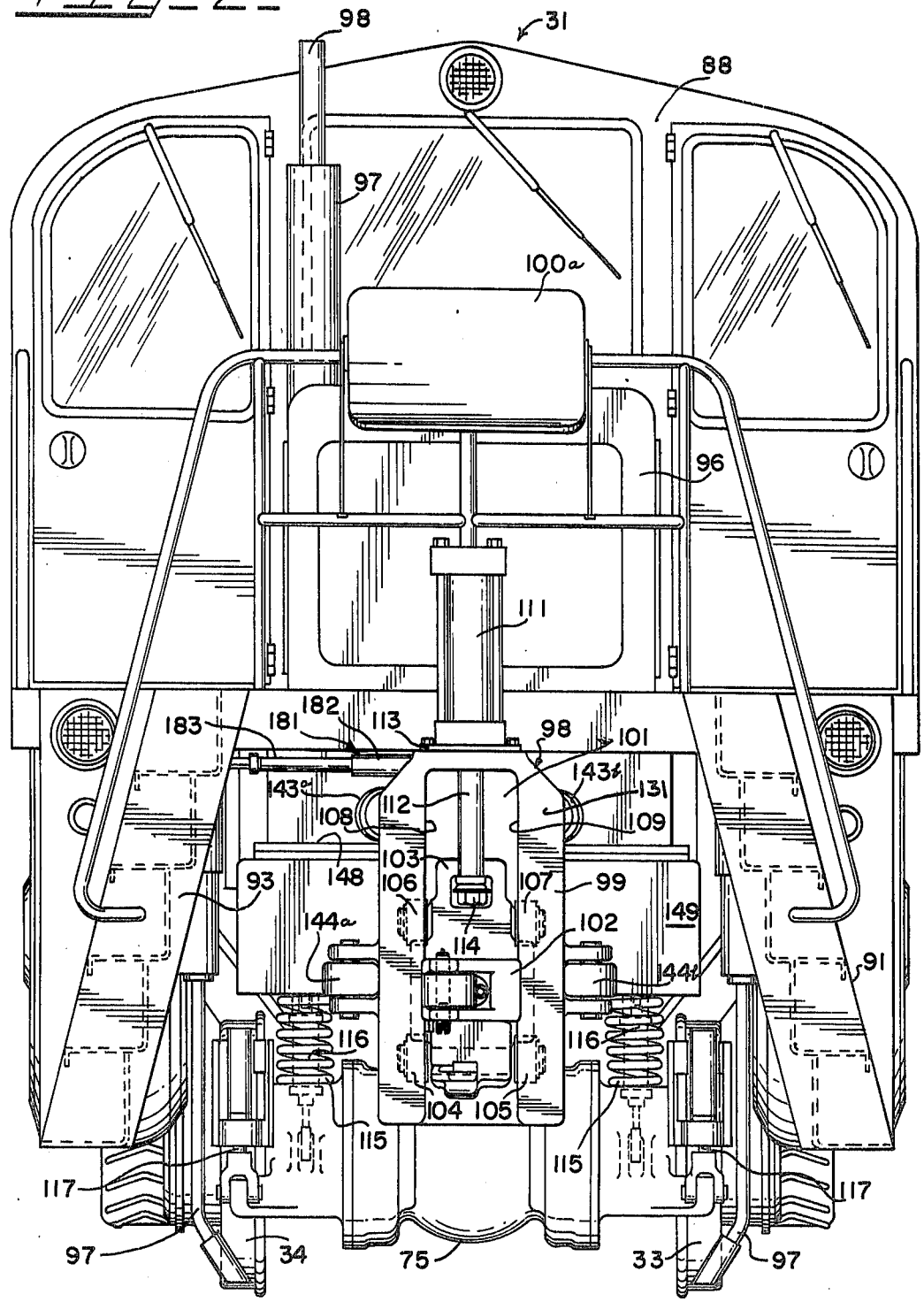
FIG_2

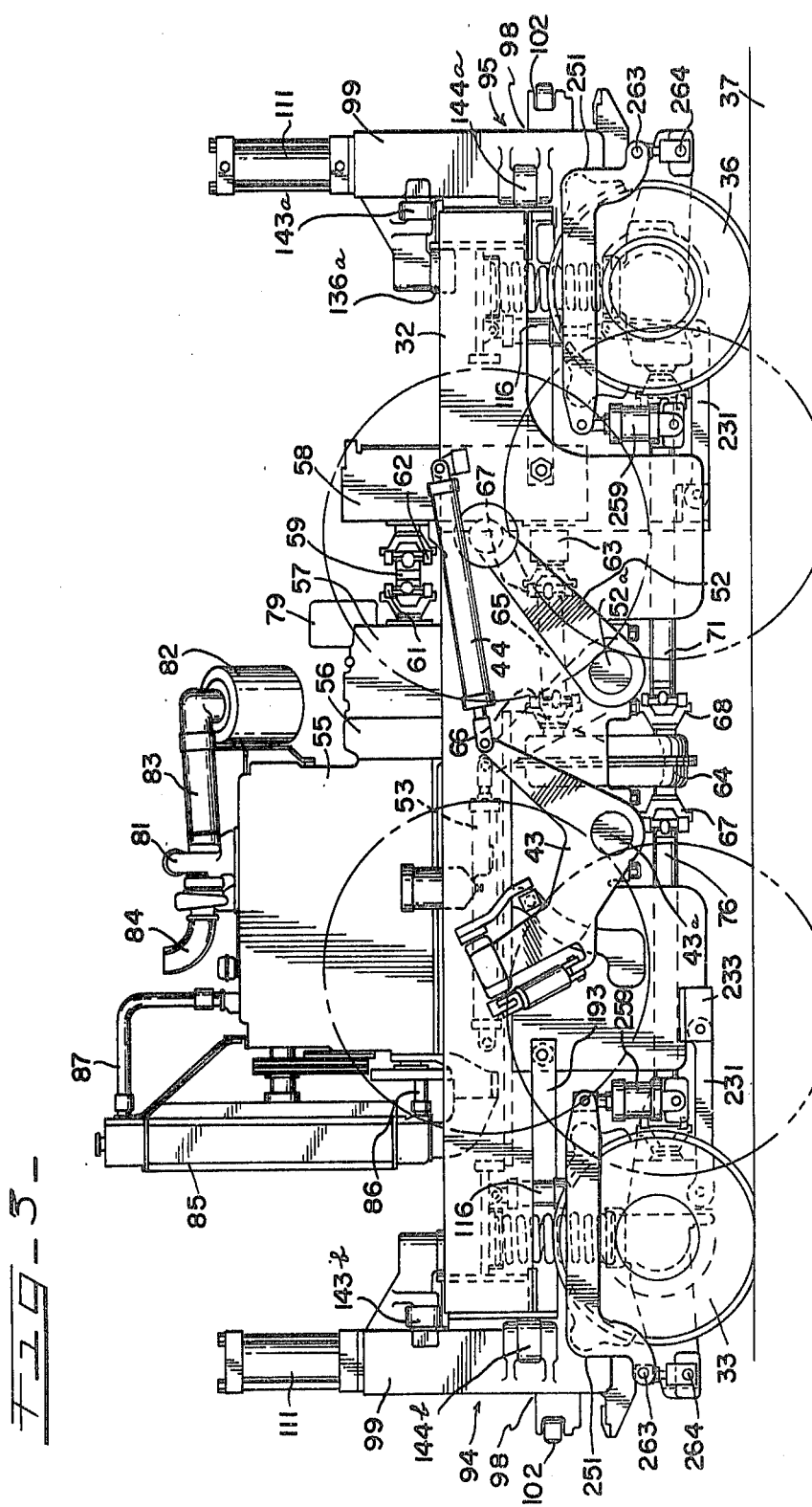

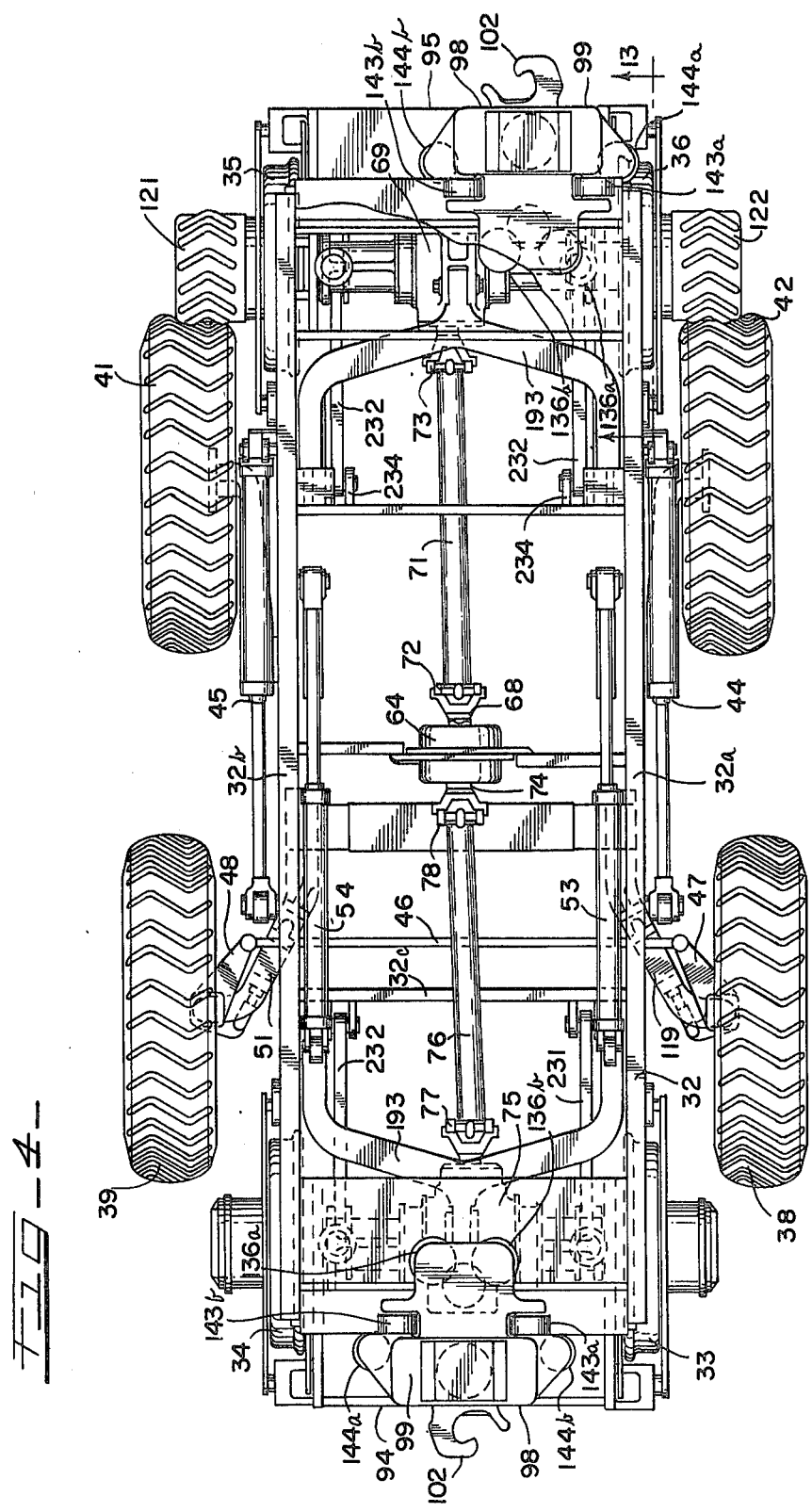
FIG_4

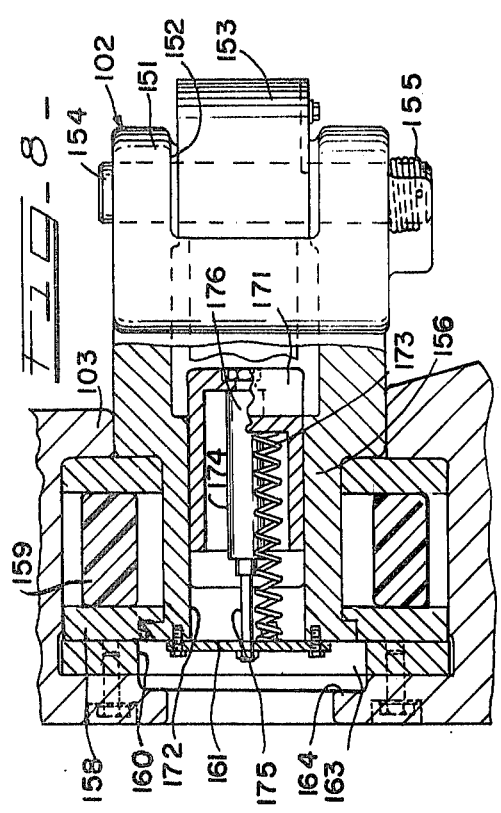
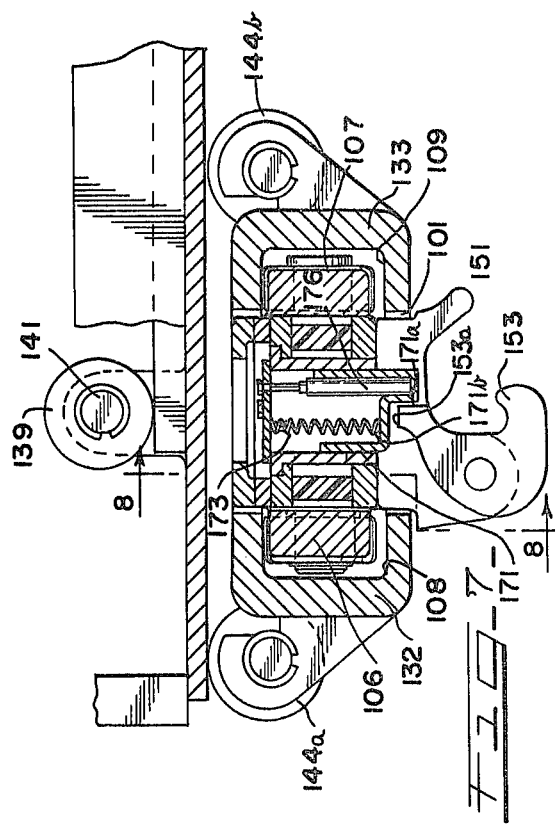
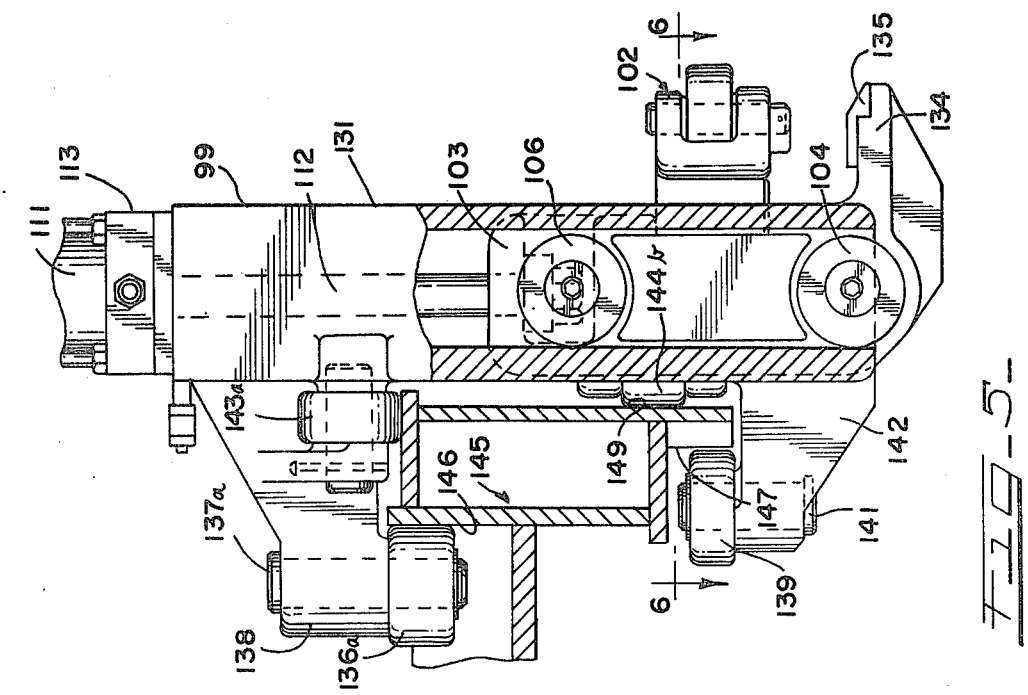

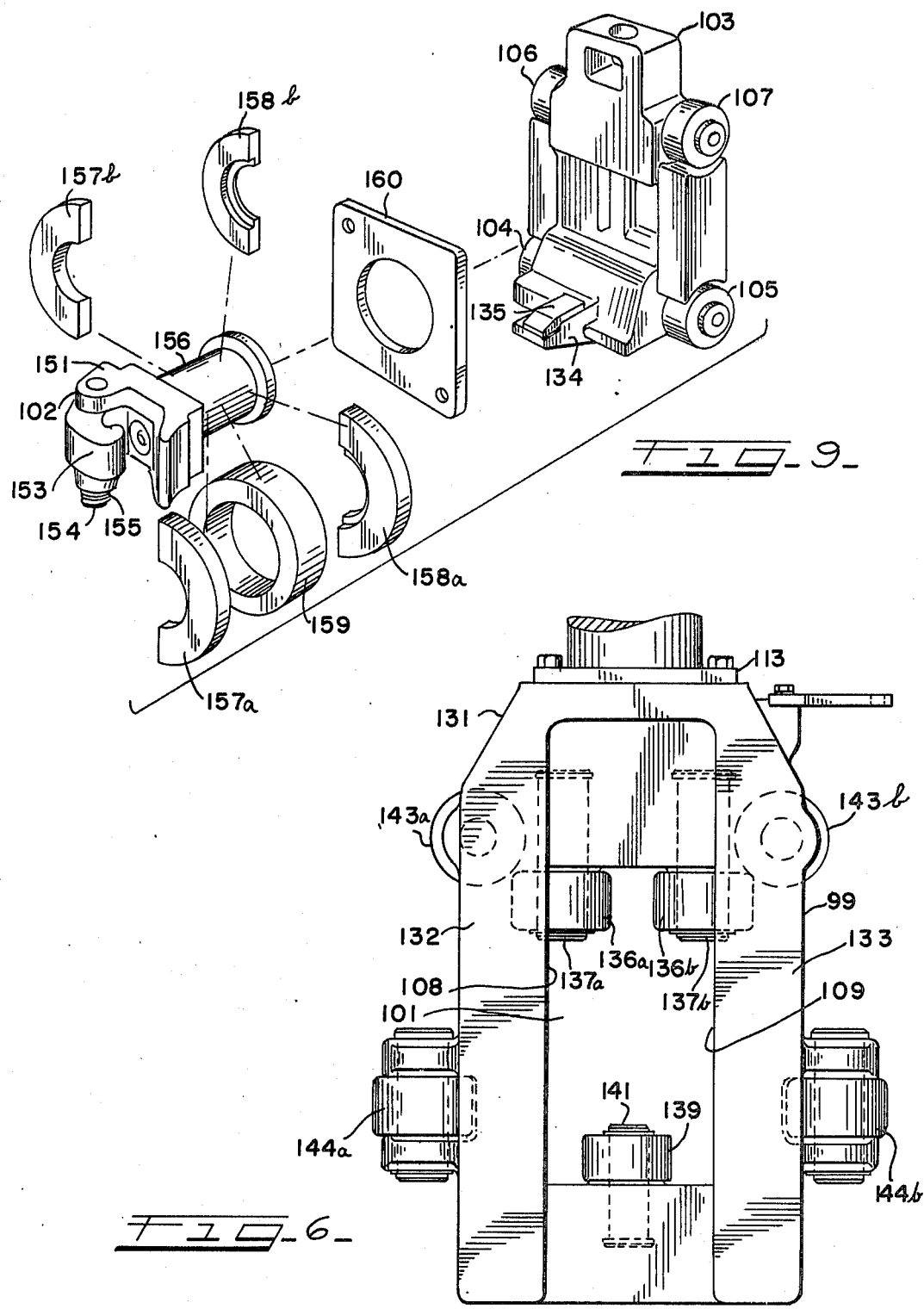

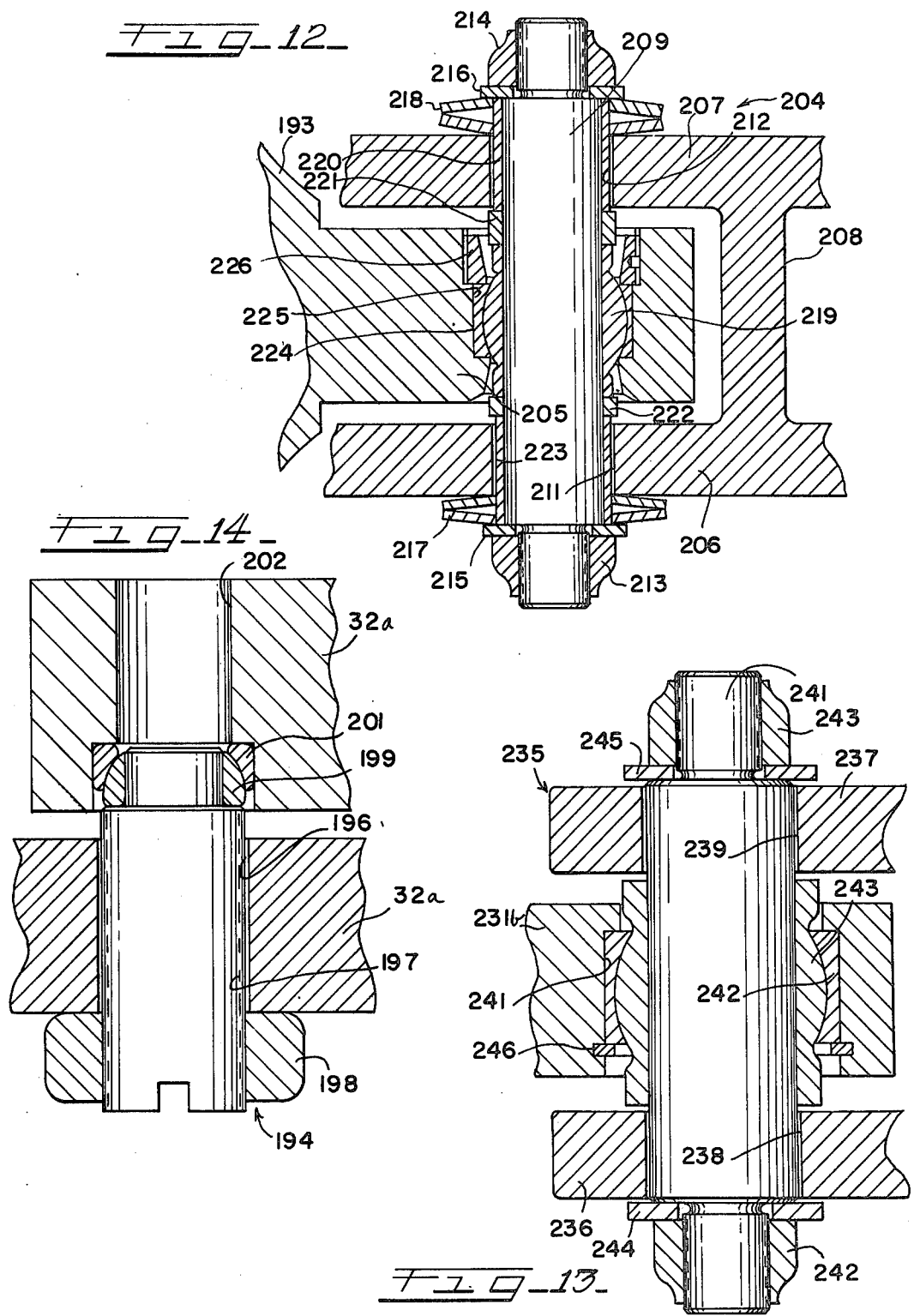

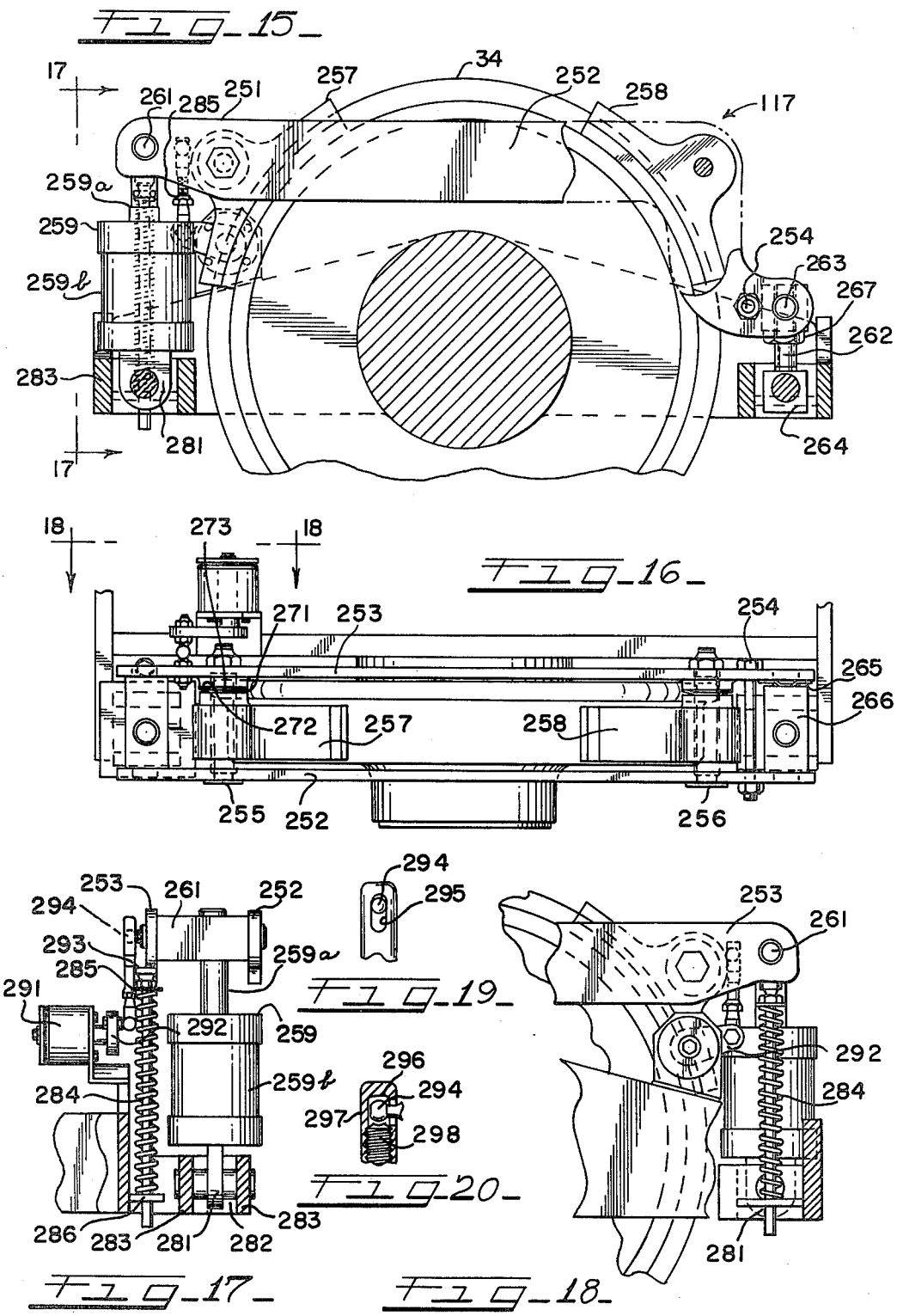

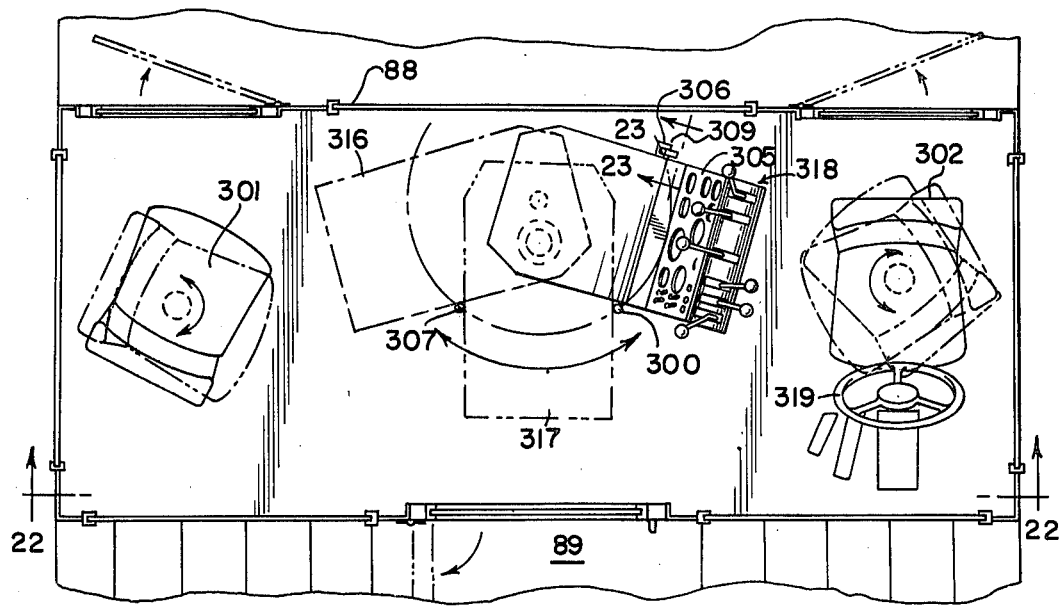
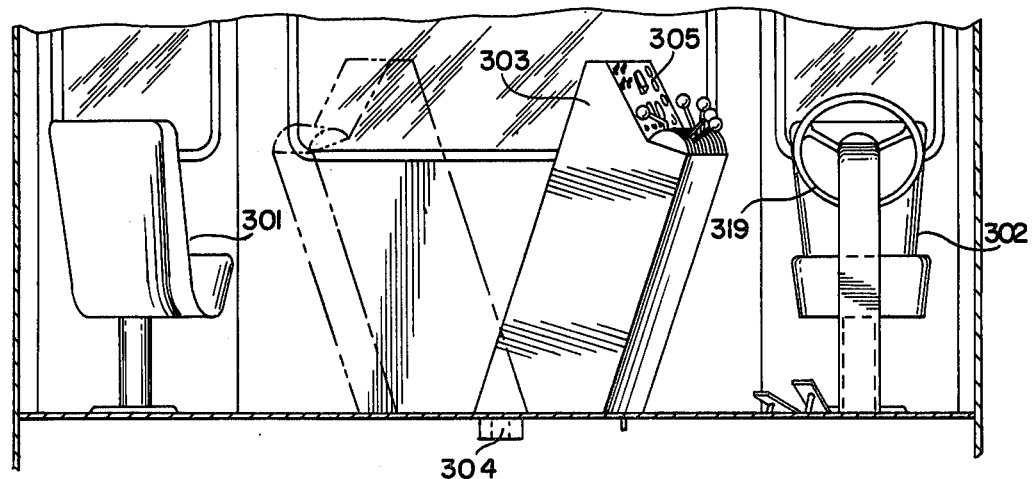
FIG.22
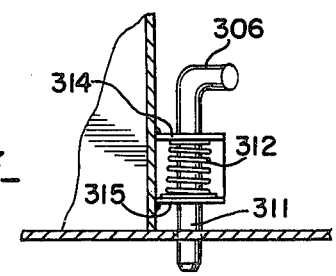
FIG.23

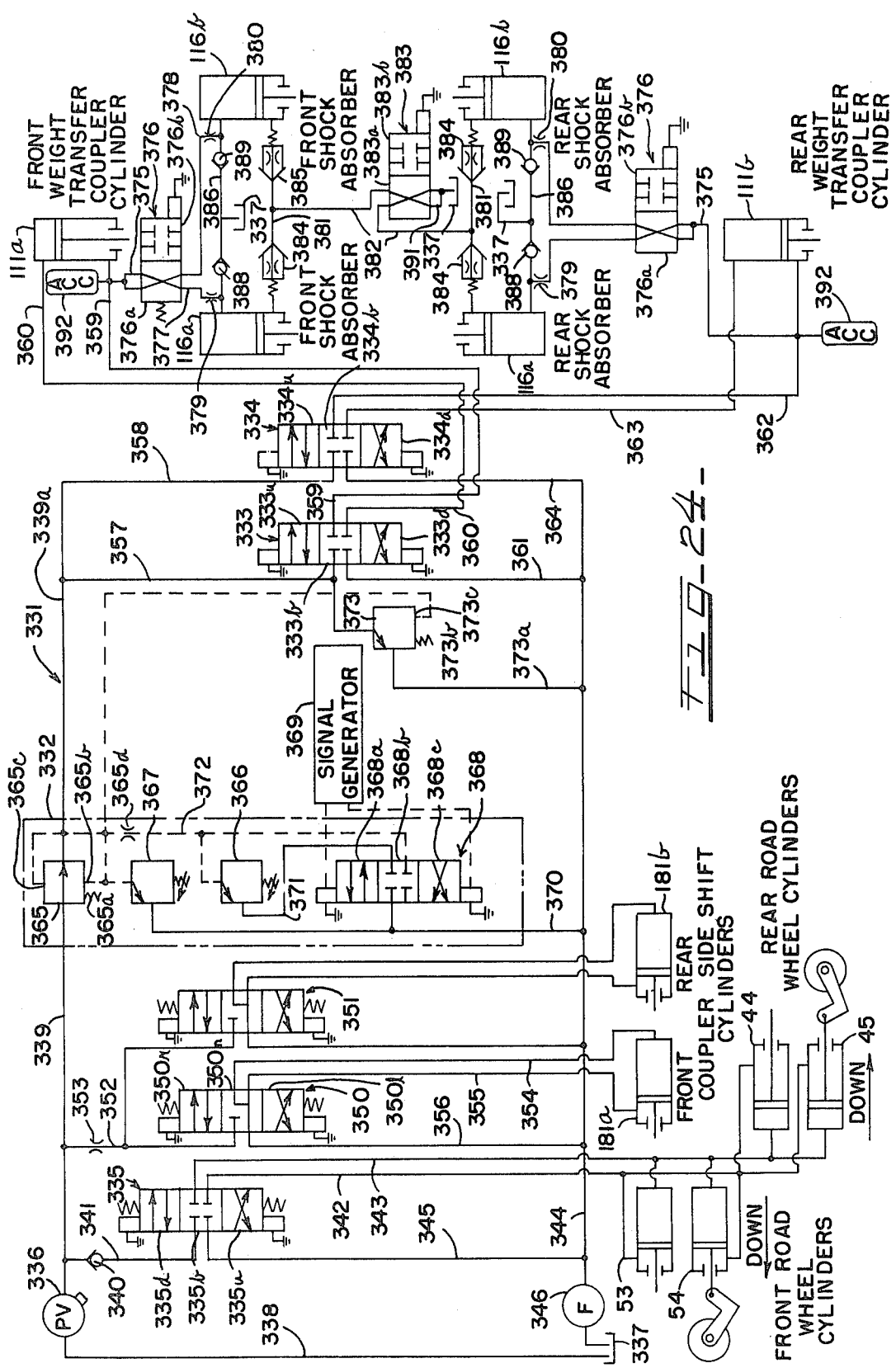

CONVERTIBLE RAIL-HIGHWAY TRACTION VEHICLE CONTROL CAB

This application is a division of application Ser. No. 552,711, filed Feb. 24, 1975, now U.S. Pat. No. 4,067,259, issued Jan 10, 1978, which, in turn, was a continuation-in-part of our copending application Ser. No. 437,283, filed Jan. 28, 1974, now U.S. Letters Pat. No. 3,884,156, entitled "Automatically Traction Effort Controlled Convertible Rail Highway Tractor."

BACKGROUND AND DESCRIPTION OF THE INVENTION

The present invention generally relates to rail car moving vehicles adapted for travel on rail wheels to move one or more rail cars on a railway track and, more particularly, to weight transfer rail traction rail car moving vehicles, namely, vehicles capable of developing, when coupled to a rail car, a tractive effort greatly in excess of the tractive effort attributable to their own weight through the transfer of weight from a rail car coupled thereto. In this regard, this invention is specifically directed to a unique rail car moving vehicle capable of traveling on separate sets of road or rail wheels and characterized by a number of advantageous features which include: a novel spring supported floating axle that functions in a rail travel mode to enable the vehicle to travel at relatively high speeds compared to prior art rail traction vehicles adapted for both road and rail travel; a shock absorber system which functions in the rail travel mode to maintain the axle supporting springs in an active and functioning condition despite increased loads to the vehicle (such as, for example, are typified when the traction vehicle is in a weight transfer condition) by exerting a counteracting force to the support springs which at least partially offsets the spring depression induced by such increased loads; a hydraulic system which selectively deactivates the springs interposed between the differential axle and frame such as, for example, when the vehicle is operated in a road travel mode wherein it is supported wholly on road wheels which are driven by the engagement thereof with driving hubs mounted to the differential axle so as to maintain the rotational axes of the driven road wheels; a novel differential axle suspension system wherein a spring supported axle moves in a substantially vertical plane without lateral shifting; a unique coupler mounting arrangement which provides the coupler with shock absorbing capability and wherein the coupler is mounted to a coupler carriage which in turn is mounted to and rides along a lateral frame member of the vehicle which serves as a guideway for directing travel of the coupler carriage and coupler along a horizontal path and wherein the coupler itself is vertically movable with respect to the carriage whereby the coupler is provided with both horizontal and vertical straight line coupler travel across the ends of the vehicle affording maximized vehicle coupler extent and, accordingly, improved coupling engagement on curves irrespective of the lateral location and vertical elevation of the coupler; a rail wheel brake system which provides rail wheel brakes which are self-centering, self-adjusting and equipped with a brake shoe mounting arrangement wherein force transmission to the bearings during rail wheel braking is substantially reduced; and, a novel pivoting console and multiple rail operation driving station arrangement wherein the rail wheel mode operation gages and controls are able to be selectively positioned to afford the vehicle operator easy access thereto from the particular rail driving station which also affords the operator maximum visibility.

It is a general object of the present invention to provide a new and improved weight transfer rail traction rail car moving vehicle.

Another object of the present invention is to provide an improved rail traction vehicle capable of traveling at increased speeds on railway track which vehicle includes rail wheels that are spring supported to the frame wherein the spring support for said rail wheels is maintained in an active and functioning condition even though the vehicle is under the influence of increased loading, such as, for example, the transfer of weight from a rail car coupled thereto. In this regard, an important object of the present invention is to provide a weight transfer rail traction vehicle having rail wheels which are spring supported to the frame and shock absorbers which are mounted between the rail wheels and frame wherein spring depression induced by the transfer of weight to said vehicle from a rail car coupled thereto is at least partially offset by applying a counteracting force to the spring support through the shock absorbers.

Another object of the present invention is to provide a rail traction vehicle having a differential axle which can be optionally spring supported to the frame or maintained in a fixed relationship therewith.

Another object of the present invention is to provide a rail traction vehicle of the type adapted to be alternatively supported on road or rail wheels wherein the road wheels are driven by a driving hub, the rotational axis of which is in fixed relation with a differential axle, which vehicle is characterized by having said differential axle spring supported when the vehicle is driven on the rail wheels and in fixed relation with the frame when the vehicle is driven on the road wheels so that the rotational axes of the driven road wheel and road wheel driving hub are in fixed relation to each other. In this regard, an important object of the present invention is to provide a rail traction vehicle having a differential axle spring supported to the frame with a hydraulic cylinder and piston assembly interposed between the axle and frame wherein movement of the piston in the hydraulic cylinder can be selectively locked to maintain the differential axle in fixed relationship with the frame.

Another object of the present invention is to provide a weight transfer coupler mounting for a weight transfer rail traction vehicle wherein the coupler is able to absorb longitudinal shock forces imparted thereto with respect to the direction of travel of the vehicle. In this regard, an important object of the present invention is to provide a weight transfer coupler mounted to a coupler carriage which coupler is movable in a fore and aft direction with respect to the longitudinal centerline of the vehicle wherein a resilient cushion is interposed between the coupler and frame to provide the coupler with improved shock absorbing capability.

Another object of the present invention is to provide an improved coupler mounting for a weight transfer rail traction vehicle, wherein the coupler is mounted to a coupler carriage supported by a horizontal vehicle frame member which serves as a guideway for the coupler carriage and along which the coupler carriage is selectively power driven or freely movable in a horizontal plane along a straight line path by a side-shaft guide member fixed to the frame and wherein the coupler is also guided and powered for movement in a vertical direction with respect to the coupler carriage.

Another object of the present invention is to provide an improved brake system for vehicles which travel on rail wheels such as, for example, weight transfer rail car moving vehicles. In this regard, an important object of the present invention is to provide a novel rail wheel brake wherein the brake arm to which a pair of brake shoes are mounted has one end connected to a brake actuating means and the opposite end to a brake-action pivot point which is located for directing the brake arm through an arcuate path by which substantially simultaneous contact of the brake shoes with a braking surface which is in fixed rotational relationship to the rail wheel which is in operative association with the brake system is achieved.

Another object of the present invention is to provide an improved rail wheel brake system which includes dual brake shoes which are mounted to a brake arm in a spaced apart relationship to each other which minimizes the transfer of braking forces to the bearings in association with the rail wheel. In this regard, an important object of the present invention is to provide an improved brake system wherein first and second brake shoes engage a braking surface at respective locations at which one of the vertical and horizontal force components of the force on the braking surface created by the first brake shoe will be substantially cancelled by a corresponding but opposite direction force component of the force on the braking surface created by the second brake shoe.

Another object of the present invention is to provide a brake system for a vehicle which travels on rail wheels wherein the brake shoes are self-centering on the braking surface. In this regard, an important object of the present invention is to provide a rail wheel brake system which includes a brake arm connected to an actuating means at one end and to a brake-action pivot point at the opposite end which brake arm also includes a second pivot point located between the brake-action pivot point and the opposite end of the brake arm wherein the brake arm is preferentially pivotable about the brake-action pivot point as opposed to the second point, thereby resulting in the brake arm upon being actuated by the driving means pivoting in an arcuate path about the brake-action pivot point in a manner by which if one of the brake shoes on the brake arm should initially contact the braking surface before the other brake shoe, then the continued application of the actuating means to the brake arm will cause the brake arm portion between the actuating means and second pivot point to be rocked about the second pivot point until the other shoe is in contact with the braking surface.

Another object of the present invention is to provide an improved self-adjusting rail wheel brake.

Another object of the present invention is to provide a suspension system for a differential axle in a rail car moving vehicle adapted for travel on rail wheels which differential axle is spring supported to said frame for movement along a substantially vertical plane only without substantial, if any, lateral shifting thereof.

Another object of the present invention is to provide a rail car moving vehicle adapted to be coupled to one or more rail cars at either or both ends of the vehicle wherein the operator of the vehicle during the travel thereof on rail tracks is able to selectively operate the vehicle through a single set of vehicle operation controls from a plurality of locations in a cab on the vehicle enabling such operator to position himself for maximum visibility irrespective of the direction of travel of the vehicle.

These and other objects, features and advantages of the present invention will be apparent from the following detailed disclosure, taken in conjunction with the accompanying drawings wherein like reference numerals refer to like parts, in which:

FIG. 1 is a side elevational view of a traction vehicle embodying the present invention with certain portions thereof shown in phantom;

FIG. 2 is a rear elevational view, partially shown in phantom, of the vehicle shown in FIG. 1;

FIG. 3 is a side elevational view of the vehicle shown in FIG. 1 with the housing and cab removed to illustrate the interior construction of such vehicle and with certain components of the vehicle shown in phantom;

FIG. 4 is a top view of the vehicle shown in FIG. 1 with the housing, cab and other components removed and with certain components shown in phantom;

FIG. 5 is a fragmentary side elevational view with portions thereof broken away of the coupler carriage and coupler assembly of the present invention;

FIG. 6 is an end view of the coupler carriage with the coupler removed therefrom;

FIG. 7 is a sectional view taken along the line 6—6 of FIG. 5 with portions thereof broken away illustrating the interior construction of the coupler carriage and coupler shown in FIG. 5;

FIG. 8 is a sectional view generally along the line 8—8 of FIG. 7 illustrating the coupler shock absorber means of the present invention;

FIG. 9 is an exploded perspective view of the coupler support member and coupler of the present invention;

FIG. 12 is a sectional view taken along the line 12—12 of FIG. 11;

FIG. 13 is a sectional view taken along the line 13—13 of FIG. 11;

FIG. 14 is a sectional view taken along the line 14—14 of FIG. 10;

FIG. 15 is a side elevational view partially broken away and partially in section illustrating the brake system of the present invention;

FIG. 16 is a fragmentary top plan view of the brake system shown in FIG. 15;

FIG. 17 is an end view of the portion of the brake system shown in FIGS. 15 and 16 taken from the direction indicated by the arrows from the line 17—17 of FIG. 15;

FIG. 18 is a back view of a portion of the brake system shown in FIGS. 15 and 16 taken from the direction indicated by the arrows from the line 18—18 in FIG. 16;

FIG. 19 is an enlarged fragmentary side view of an elongated slot-pin lost motion link forming a component of one embodiment of the brake system of the present invention;

FIG. 20 is a general schematic view, partially in section and broken away, illustrating a modified ball joint type lost motion link forming a part of the brake system of another embodiment of the present invention;

FIG. 21 is a plan view of the interior of the cab of the rail car moving vehicle shown in FIG. 1 illustrating the pivotably mounted control console feature of the present invention;

FIG. 22 is a view of the interior of the cab housing shown in FIG. 21 taken in the direction indicated by the arrows along the line 22—22 of FIG. 21;

FIG. 23 is an enlarged view, partially in section, taken in the direction of the arrows along the line 23—23 in FIG. 21 illustrating the console floor mounted locking means shown in FIG. 21; and FIG. 24 is a schematic diagram of a hydraulic circuit utilized for operating various aspects of the rail traction vehicle of the present invention.

Figure 11:
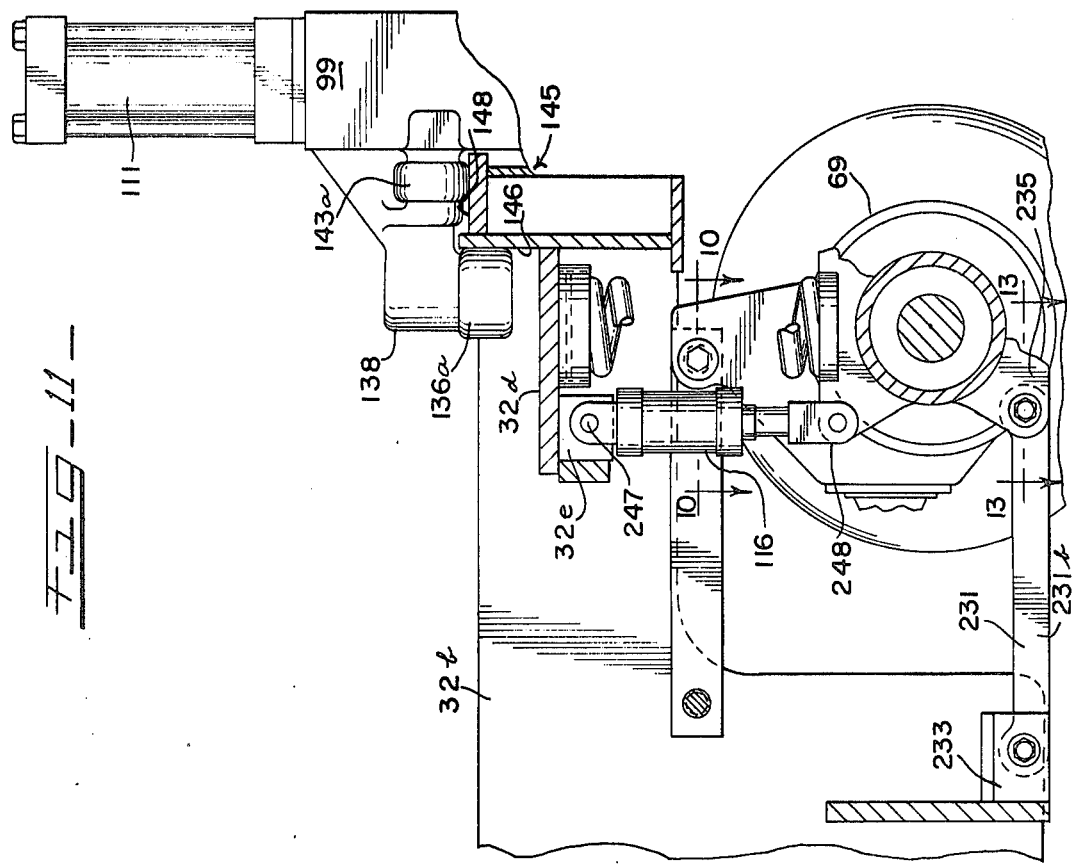
FIG. 11 is a sectional view taken along the line 11—11 of FIG. 10 with portions thereof removed.

Referring now to FIGS. 1 through 4, a weight transfer rail traction rail car moving vehicle embodying the principles of the present invention is generally designated by the reference numeral 31 and includes a frame 32 to which rail wheels 33, 34, 35 and 36 are spring mounted when the vehicle is in a rail travel mode and rigidly mounted when the vehicle is in a road travel mode in a manner which will be explained more fully hereinafter.

As shown, the vehicle 31 is supported wholly on the rail wheels which ride on a railway track 37. If desired, vehicle 31 can also be selectively and alternatively supported wholly on the road wheels 38, 39, 41 and 42 which are pivotably mounted for movement to a lower position as generally depicted in phantom in FIGS. 1 and 3. In particular, road wheel 38 is mounted to a bell crank 43 fixed to the frame 32 at a pivot point 43a which is powered by a hydraulic cylinder and piston assembly 44. Similarly, road wheel 39 is operatively connected to a comparable bell crank (not shown) which is powered by a hydraulic cylinder and piston assembly 45. In the illustrated embodiment, road wheels 38 and 39 are steerable through a steering linkage which includes a tie rod 46 having connecting links 47 and 48 connected in a known manner to the hub portions of the steerable wheels 38 and 39. As is best shown in FIG. 4, the steering linkage is power assisted through hydraulic cylinders 49 and 51 which respectively can be connected with the steering linkage and respective hubs of the wheels 38 and 39 in a conventional manner.

Road wheels 41 and 42 are likewise pivotably mounted for movement to a lowered position by powered bell cranks associated therewith. For example, as shown in FIG. 3, a bell crank 52 is fixed to the frame 32 at a pivot point 52a and powered by a hydraulic cylinder and piston assembly 53 while the oppositely disposed road wheel 41 is similarly connected to a like bell crank (not shown) which is powered by the hydraulic cylinder and piston assembly 54.

Road wheels 38, 39, 41 and 42 can be composed of rubber or rubber-like material and can be of pneumatic or other suitable construction so as to provide the vehicle in a road wheel mode operation with greater stability, high ground clearance and the ability to clear and climb road obstacles.

A power train for supplying power to the road and rail wheels is provided by an engine 55 having an output shaft which connects to a fly wheel (not shown) enclosed within a bell housing 56 having a power input connection into a torque converter 57 which is connected to a transmission 58 through a drive shaft 59 which includes a pair of universal joints 61 and 62. A power output connection 63 from the transmission is coupled to a drop box 64 through a drive shaft 65 which is equipped with a pair of universal joints 66 and 67.

A power output connection 68 from the drop box 64 is drivingly connected to a differential axle 69 through a drive shaft 71 equipped with a pair of universal joints 72 and 73. Likewise, the opposite end of the drop box 64 includes a power output connection 74 which is connected to a drive axle 75 at the opposite end of the vehicle through a drive shaft 76 equipped with a pair of universal joints 77, 78.

Engine 55 also serves to drive a hydraulic pump 79 through an output connection from the torque converter and, in the illustrated embodiment, is equipped with a turbocharger 81 having an air cleaner inlet 82 connected thereto through a suitable hose 83. The turbocharger 81 is driven in a known manner by the exhaust from the engine which is discharged through an exhaust outlet connection 84. In the illustrated embodiment, cooling of the engine is achieved through a radiator 85 connected to the block of engine 55 through hose connections 86 and 87.

Referring to FIG. 1, the vehicle 31 is shown to include a cab housing 88 which is mounted to a deck 89. A pair of mirrors 100a and 100b are mounted to opposite ends of the vehicle to afford the operator with a view of the railway track and rail wheels to facilitate alignment thereof when the vehicle is converted from a road travel mode operation to a rail travel mode operation. Cab 88 is accessible through stair units 91, 92 and 93, stair units 91 and 93 being mounted to the vehicle 31 at the end which is generally designated by the reference numeral 94. Stair unit 92 and a second stair unit (not shown but oppositely disposed with respect thereto) are mounted to the vehicle 31 adjacent the other end generally designated by the reference numeral 95. As shown, an engine enclosure housing 96 from which an exhaust muffler 97 and exhaust outlet pipe 98 extend is mounted to the deck 89. Since the operator of the vehicle faces the end 95 when the vehicle is in a road wheel travel mode that end of the vehicle may be, for purposes of reference, regarded as the front end with the opposite end 94 being regarded as the rear end of the vehicle.

If desired, the vehicle 31 can be equipped with a plurality of sand discharge lines 97' which communicate with a suitable sand or equivalent material supply (not shown) and which can be powered by compressed air or other suitable means for discharging sand onto a railway track for overcoming slippage between the rail wheels and railway track when necessary.

In accordance with an important aspect of the present invention, each end of the vehicle 94 and 95 is equipped with a coupler and coupler carriage assembly 98 which will be more fully described hereinafter and which are adapted for mating lifting and draft engagement with a coupler on the rail car to be moved by the vehicle 31. As shown in FIG. 2, the assembly 98 includes a carriage 99 having a vertically disposed channel guide 101 in which a coupler 102 is received. As shown, coupler 102 is mounted to a support member 103 which, in turn, is provided with a plurality of rollers 104, 105, 106 and 107 which are retained in vertically disposed guideways or tracks 108 and 109 for guiding the vertical travel of the coupler 102 with respect to the carriage assembly 99. Powered raising and lowering of the coupler 102 is achieved by means of a weight transfer double acting hydraulic cylinder 111 from which a rod 112 extends downwardly. As shown, the cylinder 111 is mounted to an upper support bracket 113 on the coupler carriage 99 and the rod 112 fixed at its lower end to the support member 103 by means of a lock nut 114. The construction and operation of the coupler and coupler carriage assembly 98 will be described more fully in conjunction with FIGS. 5 through 9 hereinafter.

Referring to FIG. 2, the differential axle 75 is spring mounted to the frame 32 through coiled springs 115 with which hydraulic shock absorbers 116 are operatively associated. Differential axle 69 is similarly spring mounted to the frame. The construction, operation and features of the suspension system of the present invention will be more fully described hereinafter in conjunction with FIGS. 10 through 14 and 24.

In accordance with another aspect of the present invention, the vehicle 31 is equipped with a novel self-centering and self-adjusting rail brake assembly 117 the construction and operation of which will be described hereinafter in conjunction with FIGS. 15 through 18.

In the road wheel travel mode, that is, when the vehicle 31 is supported wholly on the road wheels 38, 39, 40 and 41, power transmission to the road wheels is achieved by means of driving hubs 121 and 122 respectively mounted outboard of rail wheels 35 and 36 and corotatably fixed thereto for rotation along the axis of the differential axle 69. The driving hubs 121 and 122 each include a lugged driving surface which is adapted to engage with the deeply grooved tread portion of each of the road wheels 41 and 42 to drivingly rotate the same. In accordance with an important aspect of this invention described more fully in conjunction with FIGS. 10 through 14 and 24, the rotational axis of the driving hubs 121 and 122 is maintained in fixed relationship with the rotational axis of the road wheels 41 and 42.

The novel coupler and coupler carriage assembly 98 of the present invention includes a mounting arrangement for the coupler 102 which provides the coupler with shock absorbing capability with respect to forces transmitted thereto along the longitudinal axis of the coupler. In addition, this assembly 98 also provides a means by which the carriage 99 is mounted to a guiding system which is in fixed relationship with the vehicle frame for guiding movement of the coupler carriage 99 to slide the coupler 102 in a horizontal plane along a straight line path which is substantially parallel to the axis of rotation of the wheels.

Referring to FIGS. 5 through 9, the coupler carriage 99 is shown to include a main body 131 in which the channel 101 is generally vertically and centrally disposed. As best shown in FIGS. 6 and 7, the sidewall portions 132 and 133 of the main body 131 of the carriage respectively define the guideways 108 and 109 in which the vertical shift rollers 104, 105, 106 and 107 which are rotatably mounted to the support member 103 are received. As shown in FIGS. 5 and 6, the lower portion of the support member 103 includes an outwardly extending lift plate 134 on which a wearing shoe 135 is mounted so that upon raising or lowering of the support member 103 and coupler 102 when the coupler is in mating engagement with a coupler on a rail car to be moved by the vehicle the rail car coupler can be elevated to transfer weight from such rail car to the vehicle for the purpose of increasing the traction between the rail wheels of the vehicle 31 and the railway track in known manner.

The main body 131 of the coupler carriage is provided with novel side shift means which enable the coupler to be guided in a horizontal plane along a straight line path which is substantially parallel to the axis of rotation of the rail wheels. In particular, this side shift means includes a pair of upper rear horizontal side shift rollers 136a and 136b which are respectively mounted for free rotation about a pair of pins 137a and 137b which, in turn, are supportingly mounted to a support arm 138 integrally formed with the main body 131. Similarly, a lower horizontal side shift roller 139 is mounted to and freely rotatable about the axis of a pin 141 which, in turn, is mounted to a support arm 142 integrally formed with the main body 131. In the illustrated embodiment, the side shift means also includes a pair of upper vertical side shift rollers 143a and 143b and a pair of lower forward horizontal side shift rollers 144a and 144b which are respectively mounted to said main body 131 and freely rotatable.

The side shift rollers are respectively guided by the vehicle frame side shift roller guideway assembly 145 which is integral with and a part of the frame 32 for guiding the side shift rollers along a straight line path transverse to the longitudinal centerline of the vehicle and parallel to the axis of rotation of the rail wheels. As shown, the side shift guideway assembly includes a vertical planar surface 146 which is in direct contact with rollers 136a and 136b, a vertical planar surface 147 in contact with roller 139, a horizontal planar surface 148 in contact with rollers 143a and 143b and a vertical planar surface 149 in contact with rollers 144a and 144b.

As best shown in FIGS. 7, 8 and 9, the coupler 102 includes a coupler head 151 which adjacent its outer end defines an opening 152 in which a coupler knuckle 153 is movably mounted by means of a knuckle pin 154 which is corotatable therewith. As shown, a torsion spring 155 is fixed to the knuckle pin 154 to bias the knuckle 153 toward the open position. The coupler head 151 extends into a coupler shank or tongue portion 156 around which front and rear bumper retainer plates 157 and 158, respectively formed in hemicircular sections 157a, 157b and 158a, 158b are mounted. Interposed between the bumper retainer plates 157 and 158 is a resilient cushion or shock absorbing ring 159 which, in accordance with an important aspect of the present invention, provides shock absorbing action to the coupler 102. The shock absorbing ring 159 can be composed of any suitable resilient material exhibiting a high spring rate such as, for example, a polyurethane having a 90 durometer rating. A retainer plate 160 is fixed to the back side of support member 103 by suitable bolts while a retainer strap 161 which is fixed to the back end of coupler shank 156 serves as an anchoring member for the coupler knuckle actuating components which will be described below. As will be appreciated from FIG. 8, the coupler 102 is movable in a fore and aft direction with respect to the centerline of the vehicle by reason of the recess 163 defined between the plane of the forward face of retainer plate 160 and inwardly extending flange portion 164 of the coupler support member 103. Accordingly, movement of the coupler 102 will result in compression of the shock absorbing ring 159 disposed between the coupler head and frame of the vehicle in a manner which will not interfere with the ability of the coupler to be connected in mating draft and lifting engagement with a coupler on a rail car to be moved by the vehicle 31.

Coupler knuckle 153 can be selectively opened to facilitate coupling engagement with a railway coupler from a location inside the cab 88 by means of a coupler plunger 171 which is slidably received within an inner core 172 formed in the coupler head 151. Coupler plunger 171 includes a forward end 171a which is engageable with the rear portion 151a of the coupler knuckle 153a to retain the knuckle in a closed position. A coil spring 173 retained between the retainer strap 161 and an interior shoulder 171b in the coupler plunger 171 serves to urge the coupler plunger 171 forwardly. A pneumatic cylinder and piston assembly 174, the rod portion 175 of which is fixed to the retainer strap 161 and the cylinder portion 176 of which is fixed to the coupler plunger, serves to enable the operator of the vehicle to retract the coupler plunger.

As best shown in FIG. 2, the coupler carriage main body 131 is powered by a side shift power means which, in the illustrated embodiment, is a double acting hydraulic cylinder and piston assembly 181 which includes a cylinder portion 182 fixed to the vehicle frame. In this manner, the operator of the vehicle, while located in the cab, is able to selectively position the coupler into alignment with a coupler on a rail car to be connected thereto. As will be more fully explained in conjunction with the hydraulic circuit shown in FIG. 24, the carriage 99 is freely movable along the straight line path defined by the side shift guideway assembly 145 when the coupler 102 is connected to a rail car coupler thereby enabling the coupler to freely move in response to lateral forces applied thereagainst as, for example, when the vehicle traverses a curved section of railway track. Accordingly, as the vehicle 31, with a rail car coupled thereto, moves along a curved track, the coupler carriage 99 is allowed to freely move along the side shift guideway assembly in a horizontal plane alone a substantially straight line which is parallel to the rotational axis of the rail wheels. As such, the coupler may be regarded as being mounted to the periphery of a circle of infinite radius for movement in a horizontal plane. In this manner, improved coupling on curves and negotiation of curves in a railway track while in a coupled condition is provided in that the mounting arrangement provides optimum axial extent with adequate coupler orientation. This is true irrespective of the elevation of the coupler 102 since the vertical travel thereof with respect to the carriage 99 is along a plane which is perpendicular to the horizontal plane defined by the coupler when the carriage moves along the side shift guideway assembly 145.

In accordance with another important aspect of the present invention, each of the differential axles 69 and 75 is spring mounted to the frame in a manner wherein the axles are movable in a substantially vertical plane without substantial, if any, lateral shifting. This novel suspension system is best shown in FIGS. 10 through 14. Since the suspension systems for axles 69 and 75 are identical, they will only be described in conjunction with axle 69.

Figure 10:
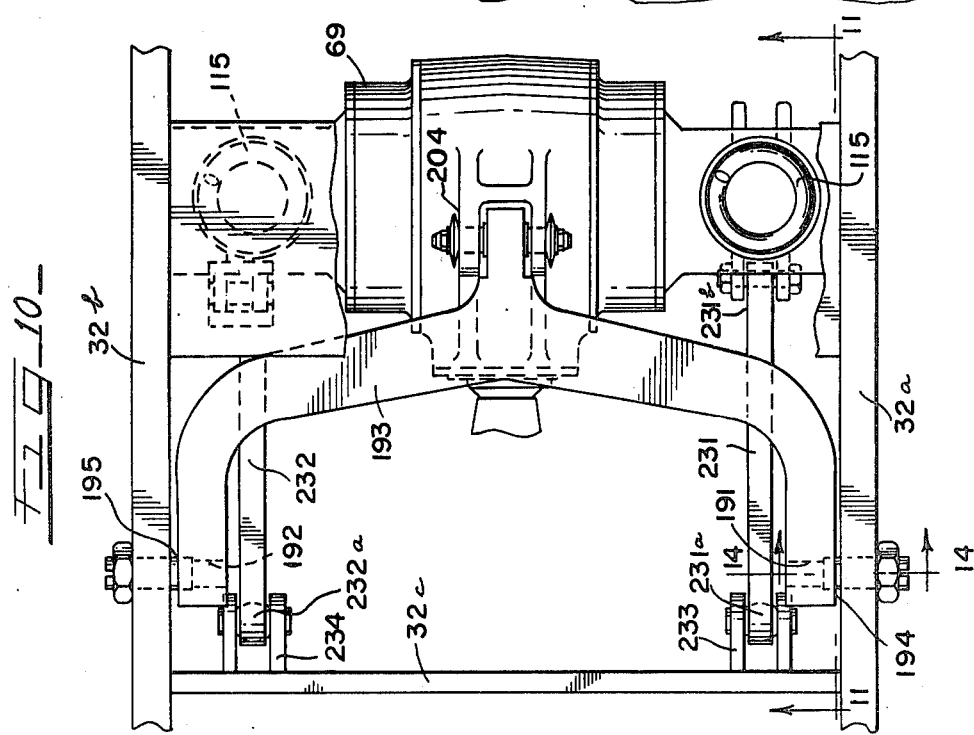
FIG. 10 is a fragmentary plan view of the differential axle suspension system of the present invention.

Referring to FIGS. 10 and 11, the frame 32 is shown to include side members 32a and 32b to which wishbone leg connecting portions 191 and 192 of a wishbone or yoke support arm are pivotally mounted through identical ball joint connections 194 and 195 respectively which ball joint connections are shown in cross section in FIG. 14. Referring to FIG. 14, the frame member 32a is shown to have a transverse threaded hole 196 formed therein which receives an adjusting screw 197. The adjusting screw 197 is retained to the frame by means of a jam nut 198 which is received about the threaded shank portion thereof. At the opposite end of the adjusting screw 197, a generally convex bushing 199 is received within a generally concave thrust bushing 201 which, in turn, is fitted within a recess 202 formed in the leg portion of the wishbone support member adjacent the connecting point 191. In this manner, the wishbone member 193 is permitted to pivot about a horizontal axis transverse to the frame members 32a and 32b and parallel to the axis of the differential axle 69.

The center portion of the wishbone support member 193 is mounted to the axle 69 adjacent the upper surface thereof through a ball joint-clevis connection 204 which is shown in section in FIG. 12. This ball joint-clevis connection provides a lateral restraint to the spring mounted axle and, as such, maintains the direction of travel of the axle along a vertical plane. Referring now to FIG. 12, the wishbone support member 193 is shown to include a tongue portion 205 which is received between the side walls 206 and 207 of the clevis 208 which is integrally formed to the differential axle housing 69. As shown, a wishbone thrust pin 209 is mounted through holes 211 and 212 which are respectively formed in the clevis side walls 206 and 207 and which are in general alignment with the transverse axis of the differential axle. The thrust pin 209 has a pair of lock nuts 213 and 214 mounted to the opposite outer ends thereof, a pair of washers 215 and 216 which are respectively inwardly thereof and a pair of disc springs 217 and 218. The ball joint connection includes a bushing 219 snugly received around the thrust pin 209 and positioned thereon by means of a plurality of spacer sleeves 220, 221, 222 and 223. A concave bushing 224 snugly fitted within a recess 225 in the tongue 205 of the wishbone support member 193 is fixed to the recess by means of a retaining nut 226. As such, it will be appreciated that the ball joint-clevis connection 204 at the center or yoke portion of the wishbone member 193 will permit that portion of the wishbone member to pivot about a horizontal axis transverse to the frame members 32a and 32b and parallel to the axis of the differential axle 69.

As best shown in FIG. 11, wishbone support member 193 is mounted to the upper surface of the differential axle 69 in generally parallel relationship with a pair of drag links 231 and 232 which respectively interconnect the lower portion of the differential axle 69 to the frame. As was true with the wishbone support member 193, the parallel links 231 and 232 have their respective ends connected to the frame and differential axle 69 for pivoting along transverse axes at each of these points of connection.

Referring to FIGS. 10 and 11, it will be noted that the end portions 231a and 232a of drag link members 231 and 232 are respectively connected through ball joint connections to like mounting brackets. For example, as shown in FIG. 11, the end 231b of drag link 231 is pivotably mounted to the lower portion of the differential axle 69 through a clevis mounting bracket support 235 integral therewith.

FIG. 13 illustrates the ball joint connection used in the preferred embodiment of the present invention at each of the points of connection of the drag links 231 and 232 to the frame or differential axle. Referring to FIG. 13, the clevis 235 is provided with a pair of side walls 236 and 237 which respectively have transverse bores 238, 239 formed therein which, in turn, receive a tie bar pin 241. As shown, tie bar pin 241 includes two oppositely disposed threaded outer shank portions to which lock nuts 242 and 243 are fitted for retention purposes. As shown, the end portion 231b of drag link 231 is provided with a recess 241 which receives a bushing member 242 engageable with a convex bushing 243 snugly fitted around the center portion of the tie bar pin 241. Suitable washers 244 and 245 are provided and the concave bushing 242 is retained in the recess 241 by means of a retaining ring 246. In this manner, the connection between the drag link 231 and the differential axle permits pivoting of the drag link about an axis transverse to the frame members 32a and 32b and parallel to the axis of the axle 69.

It should further be noted that, in accordance with an important aspect of the present invention, the pivot arm links of each of the drag links and the wishbone are substantially equal, that is, the distance between the respective points of connection of these suspension members and their respective pivot points, measured in a straight line direction transverse to the pivot axes thereof, are substantially equal. In this manner, these links are maintained in parallel relationship to each other thereby cooperating to guide and limit the displacement of the differential axle in a substantially vertical plane without substantial, if any, lateral shifting.

As best shown in FIG. 11, a spring 115 is disposed between the frame member 32d and the differential axle 69. In addition, a shock absorber 116 is operatively associated with the spring 115 and respectively interconnected between a frame mounting bracket 32e about a clevis and pin connection 247 and to the differential axle by means of a clevis and pin connection mounting arrangement generally designated by the reference numeral 248. In accordance with an important aspect of the present invention, more fully explained in conjunction with the hydraulic circuit shown in FIG. 24, the shock absorber 116 is able to be selectively charged with high pressure fluid for the purpose of inducing a force on the piston element thereof which counteracts spring depression induced, for example, by the transfer of weight to the vehicle from a rail car coupled thereto.

In accordance with another aspect of the present invention, also more fully described in conjunction with the hydraulic circuit illustrated in FIG. 24, the shock absorbers are selectively function to lock the respective differential axles 69 and 75 into fixed relation with the frame 32 when the vehicle is driven on road wheels. This feature of the present invention has the advantage of maintaining all four of the rail wheels in an upper position to provide improved clearance and also to maintain the rotational axes of the driving hubs 121 and 122 in fixed relationship with the rotational axes of the driven wheels 41 and 42.

The novel self-centering and self-adjusting rail brake system of the present invention is shown in FIGS. 15 through 20. As shown, the assembly 117 includes a brake arm 251 in the form of two spaced apart brake arm members 252 and 253 which are clamped together in spaced apart relationship to each other by means of a bolt and nut assembly generally designated by the reference numeral 254. In addition, bolt and nut assemblies 255 and 256 similarly clamp the opposed brake arm members 252 and 253 and also function to mount brake shoes 256 and 257, respectively, to the brake arm 251. In accordance with an important aspect of the present invention, the brake arm is guided in an arcuate path about a pivot point such that substantially simultaneous contact is achieved between each of the brake shoes 257 and 258 even though the arm itself is actuated by a hydraulic cylinder and piston assembly 259 mounted to a trunion 261 at one end of the brake arm 251. As best shown in FIG. 15, the brake arm 251 includes a first portion defined by the side members 252 and 253 and a second portion defined by a rigid link 262 the opposite ends of which are secured to pivot pin connections 263 and 264. In this regard, it is important to note that the pivot point connection 264 or brake-action pivot point represents a preferential pivot point with respect to the pivot point defined by the pivot pin connection 263 so that the brake arm 261 is preferentially pivotable about the brake-action pivot point 264 as opposed to the pivot point 263, resulting in the self-centering feature of the present invention. In particular, upon actuation of the hydraulic cylinder and piston assembly actuating means 259, the brake arm is downwardly drawn so that the shoes 257 and 258 may be brought into contact with a braking surface which, in the illustrated embodiment, represents the tread portion of the rail wheel 34. If one of the shoes, however, should initially contact the braking surface or rail tread portion before the other shoe, then the continued application of the actuating means will cause the brake arm portion 251 to be rocked about the pivot point 263 until the other shoe is also in contact with the braking surface.

As is also best shown in FIG. 15, it will be noted that the brake-action pivot point 264 is positioned at a location such that the respective brake shoes 257 and 258 can be brought in substantially simultaneous contact with the braking surface on the wheel 34. In the illustrated embodiment, it will be appreciated that the arcuate path of the brake arm 251 about the brake-action pivot point 264 will be such that the brake shoe 257 will approach the braking surface from a direction of travel which is substantially tangential to the braking surface. Simultaneously, the brake shoe 258 will approach the braking surface from a direction of travel which will be radially disposed with respect to the circumference of the braking surface. In this regard, an important aspect of the present invention constitutes the placement of the brake shoes on the brake arm 251 and orientation of the brake arm wherein the radially inward distance of travel of the brake shoe 257 and the radially inward distance of travel of the brake shoe 258 from the nonapplied position of the brakes to the applied position are essentially equal.

In the illustrated embodiment, preferential pivot action about the brake-action pivot point 264 as opposed to the pivot point 263 is achieved by means of wave spring washer 265 which is interposed between a trunion member 266 and the inner surface of the brake arm 253 at the point of connection thereof. In this manner, the wave spring washer, or an equivalent member, exerts a compression force on the trunion which resists rocking of the brake arm side members 252 and 253 about the pivot point 263. The lower or brake-action pivot point 264, however, is not provided with any pivot restricting means and, as such, is freely pivotable about the axis 264.

In the illustrated embodiment, the rigid link 262 can be threaded at its point of connection to the trunion 266 and provided with a lock nut 267 enabling the link to be selectively extended or reduced in length to effect the desired positioning of the brake shoes with respect to the braking surface on the rail wheel 31.

As best shown in FIG. 16, in the illustrated embodiment, the brake shoes are also provided with a means for pivoting about their respective mounting points in order to effect improved alignment thereof to the braking surface. In particular, referring for example to brake shoe 257, a wave spring or equivalent high tension spring means 271 is interposed between a lateral face 272 on the brake shoe 257 and a corresponding mating lateral face 273 on the inner side of brake arm side 253 adjacent the connection point defined by the bolt and nut mounting assembly 255. In this manner, the spring 271 exerts a force against the shoe 257 which tends to maintain the shoe in a fixed relationship which force, however, can be overcome during the braking operation if shoe alignment adjustment is required.

Another aspect of the brake shoe location of the brake system of the present invention is that the respective brake shoes 257 and 258 are maintained in a spaced apart relationship with respect to each other such that, on application of the brake actuating means 259, the shoes contact the braking surface at respective locations which result in the elimination of horizontal forces being transmitted to the bearings in which the rail wheel is rotatably mounted. In particular, the respective brake shoes 257 and 258 will engage the braking surface at locations wherein the horizontal component of the force created by the shoes 257 contacting the braking surface will be substantially cancelled by the horizontal component of the force created by the contact of the brake shoe 258 engaging the braking surface.

As shown, the hydraulic cylinder and piston assembly includes a lower mounting ear 281 which is fixed about mounting pin 282 which is relatively supported between a pair of mounting flanges 283. In this manner, relative movement of the rod portion 259a with respect to the cylinder 259b of the assembly 259 will result in movement of the brake arm by reason of the fixed connection between rod 259a and brake arm mounting trunion 261. As shown in FIGS. 17 and 18, the brake arm 251 is biased upwardly by means of a coil spring 284 which at its upper end engages a collar 285 in fixed relationship with the inner brake arm side member 253 and, at its lower end, to a flange 286 which is in fixed relationship with the axle associated therewith. Accordingly, upon actuation of the brake actuating means, the piston rod 259a will be withdrawn into the cylinder 259b causing the brake arm to move downwardly. Upon release of the brake, however, the coil spring 284 will serve to return the brake arm to its non-applied position.

In accordance with an important aspect of the present invention, the rail wheel brake system is provided with a self-adjusting feature which, in effect, operates to regulate the extent to which the brake shoe is withdrawn from the braking surface in the non-applied position. This self-adjusting feature is achieved through the use of a one-way clutch or sprag clutch 291 which is mounted in fixed relationship to the axle 69 in an appropriate manner. As shown in FIGS. 17 and 18, the sprag clutch 291 includes an outer arm 292 which is connected to one end of a lost motion link 293. The opposite end of the lost motion link is fixed to the ball-shaped mounting stud 294 extending outwardly from the brake arm side member 253. As best shown in FIG. 18, the arm 292 is, in the illustrated embodiment, movable in a downward direction only. Accordingly, actuation of the brake actuating means 259 will result in depression of the brake arm 253 which will produce a downward movement of the lost motion link 293 and downward travel of the arm 292 on the one-way or sprag clutch 291. The extent to which the brake arm 251 is permitted to return, however, will be limited by the freedom of movement in the lost motion link so that the return of the brake arm to the non-applied position will be required to maintain a constant spacing between the shoes and the braking surface on the rail car wheel irrespective of the extent of wear on such shoes.

It will be appreciated that various forms of lost motion links can be employed in the self-adjusting rail brake system of the present invention. For illustrative purposes, however, two such forms are shown in FIGS. 19 and 20. For example, the lost motion link 293 could simply be in the form of an elongated slot 295 in which the ball-shaped member 294 fixed to the brake arm 251 is slidably received. Similarly, the lost motion link could be in the form such as that shown in FIG. 20 which can generally be depicted as a ball joint connection in which the ball portion is loosely fitted within the socket portion. Referring to FIG. 20, it will be noted that the ball-shaped portion 294 is received within a socket 296 of a ball joint connection 297 which socket is adjustably sized by means of a threaded lower ball seat which is movable with respect to the fitting 297 for purposes of selectively varying the size of the socket and thereby increasing or decreasing the extent of lost motion. It will be appreciated, however, that the extent to which threaded seat can be withdrawn is limited by the size of the ball-shaped member 294 and that such threaded seat cannot be withdrawn to an extent such that disconnection of the ball 294 from the housing 297 results.

FIGS. 21 and 22 illustrate the cab and vehicle operation control system of the rail car moving vehicle 31 which in accordance with an important aspect of the present invention, provide the operator with maximum visibility irrespective of the direction of travel. This feature is particularly important when the rail car moving vehicle 31 is pushing a large number of rail cars coupled thereto along a curved section of railway track. In such instances, it is highly desirable that the operator be able to control the operation of the rail car moving vehicle from a location which provides him with an unobstructed view of the inside of the curved section of railway track. In this connection, an important feature of the present invention concerns the console 303 which is pivotably supported on the floor of the cab 88 for rotation about a vertical pivot axis defined by a pivot pin 304. Console 303 includes a panel 305 on which are located a set of vehicle performance gages including, for example, speedometers, oil pressure gages, temperature gages, and the like as well as a set of vehicle operation controls which enable full control of the vehicle in the rail wheel mode of operation. As shown in FIGS. 21 and 22, the console is pivotable about the vertical axis 304 into a plurality of locations so that the control panel 305 is fully viewable and accessible to a vehicle operator located either on the dual driving stations 301 or 302 or, for that matter, elsewhere in the vehicle cab 88. If desired, a locking pin 306 can be provided for locking the console 304 in certain predetermined locations. One form of suitable locking pin is shown in FIG. 23 and generally includes a rod 311 which is downwardly biased by means of a coil spring 312 fixed thereto and compressed between a pair of fixed mounting brackets 314 and 315. In this manner, the pin 311 can be selectively fitted into any of a plurality of holes 307, 308 and 309 in the floor of the cab enabling the console to be selectively located in any of the positions 316, 317 or 318. It will, of course, be appreciated by those skilled in this art that forms of console locking devices may be substituted for the rod and coil spring arrangement described and shown herein.

Since the vehicle 31 is also adapted to be wholly supported for travel on road wheels, a steering wheel 319 operatively connected in a known manner to the steerable road wheels 38 and 39 is provided at one end of the cab together with associated road wheel operation controls. Accordingly, during road wheel operation, the operator will locate himself at the station designated by the reference numeral 302 from which he is provided with adequate visibility.

In accordance with another important object of the present invention, the vehicle 31 incorporates a unique hydraulic circuit characterized by a number of important advantages which will now be discussed with reference to FIG. 24. In this regard, it should be noted that portions of this circuit are described in our copending application Ser. No. 437,283, filed Jan. 28, 1974. That application concerns itself with a variable weight transfer rail traction vehicle wherein means is provided for automatically changing the amount of weight transfer rail car coupled to the vehicle in accordance with the traction demands of the vehicle. In particular, automatic weight transfer is described in that application which is responsive to any of a number of various parameters including, for example, the speed of the tractor, the torque of the engine, the draft force on the vehicle coupler, or the transmission operation.

Referring now to FIG. 24, a hydraulic circuit 331 is generally shown and includes a pilot operated solenoid controlled pressure reducing valve assembly 332, together with control valves 333 and 334 which are respectively associated with the weight transfer cylinder 111 located at the ends 94 and 95 of the vehicle. For purposes of reference thereto in the hydraulic circuit 331, the hydraulic cylinder located adjacent the end 95 of the vehicle is designated by the reference numeral 111a and the weight transfer cylinder located adjacent the end 94 of the vehicle is designated by the reference numeral 111b. The weight transfer control valves 333 and 334, together with a road wheel control valve 335, are actuable within the cab 88 of the vehicle 31 wherein operation of the weight transfer control valves 333 or 334 to respectively apply a weight transfer force to one of the weight transfer cylinders 111a or 111b effectively connects reducing valve assembly 332 to one or the other of the weight transfer cylinders. Operation of the road wheel control valve 335, also actuable within the cab, controls the up or down positions of the road wheel.

A pressure compensating pump 336 having its inlet connected to a tank 337 through a supply line 338 has its outlet connected to a high pressure supply line 339. The high pressure line 339 is connected to the road wheel control valve 335 through a check valve 340 which prevents backflow from the valve to the line 339. The control valve 335 is a three-position four-port valve which is spring loaded to, and illustrated in, a center or block position 335b. As shown, control valve 335 also includes a straight-through position which causes the road wheels to be in a down or road engaging position, and a cross position 335u which causes the road wheels to be in the up or non-road-engaging position. The control valve 335 is connected to the high pressure line 339 through a supply line 341 and into the road wheel cylinders 44, 45, 53 and 54 through lines 342 and 343. Similarly, the control valve 335 is connected to a return or tank line 344 through a line 345. Tank line 344 connects to tank 337 through a suitable filter 346. Accordingly, when the road wheel control valve 335 is in the straight position 335d as illustrated in the drawing, hydraulic fluid under pressure passes from the high pressure line 339 through the check valve 340, supply line 341, the valve 335 and line 343 to the cylinders to cause the road wheels to move to the down position. The non-pressure side of the cylinders is then connected to the tank line 344 and to the tank 337 through the lines 342, the valve 335, line 345, and return line 344. Raising of the road wheel is accomplished by moving the control valve to the cross position 335u, which connects the lines leading to and from the control valve such that high pressure fluid is then fed from the supply line 341 through the valve to the line 342 and the other end of the cylinders 44, 45, 53 and 54 to cause the cylinders to drive the road wheels to the up position. The low pressure sides of the cylinders are then connected to the tank 337 through the line 343, the valve 335, line 345 and return line 344. The check valve 340 functions to prevent the road wheels from dropping when the control valve 335 is in cross position and a pressure drop in the high pressure line 339 occurs such as, for example, by sudden demand of high pressure elsewhere in the system. The control valve 335 may be of a manual or solenoid operated type.

As shown, the high pressure line 339 is also connected to the control valves 350 and 351 which respectively control the front and rear coupler side shift cylinders 181a and 181b which respectively correspond to the coupler side shift cylinder 181 mounted adjacent the end of the vehicle 95 and the coupler side shift cylinder 181 mounted adjacent the end of the vehicle 94. In view of the fact that the construction and operation of each of these valves 350 and 351 is identical, the construction and operation of only one of them will be described herein. Referring now to control valve 350, it will be noted that the valve is of a four-port three-position type having a straight-through position designated by the reference numeral 350r in which the front coupler carriage and coupler assembly 98 will be driven in one direction, for example, to the right, a neutral position 350n in which the coupler carriage and the coupler assembly 98 will be free to move in either direction, enabling the coupler 102 when connected to a coupler on a rail car to freely traverse the straight-line path of the coupler carriage 99 and it responds to forces imposed thereto through the coupled rail car, and a cross position 350l wherein the coupler carriage and the coupler assembly 98 are moved in a direction opposite to that induced by the position 350r, for example, to the left. Valve 350 is connected to the high pressure line 339 by a supply line 352 which includes a pressure reducing orifice 353. Accordingly, when the control valve 350 is in the straight position hydraulic fluid under pressure passes through the high pressure line 339 through the orifice 353, the supply line 352, the valve, the line 354 and into the cap side of the hydraulic cylinder 181a. The rod or non-pressure side of the cylinder is then connected to the tank 337 through the line 355, the valve, the line 356 and the return line 344.

As noted, upon coupling engagement of the front coupler associated with hydraulic cylinder 181a the control valve 350 is put into the neutral position in which the piston is free to move within the cylinder 181a by reason of the interconnection of lines 354 and 355 through the valve.

When it is desired to drive the coupler carriage and coupler assembly associated with the cylinder 181a in the opposite direction, the valve 350 is moved to the cross position 350l wherein the rod side of the cylinder 181a is charged with high pressure fluid and the cap side of the cylinder 181a connected to the tank 337 through the lines associated therewith.

The weight transfer control valves 333 and 334 function to selectively apply a weight transfer force to one or the other of the weight transfer cylinders mounted to the opposite ends 94 and 95 of the vehicle 31. Of course, if desired, the rail traction vehicle of the present invention may be provided with only a single weight transfer cylinder. The pilot operated reducing valve 332 is positioned between control valves 333 and 334 and the high pressure line 339, thereby controlling the high pressure in the control valves automatically in response to the traction demands of the vehicle. Accordingly, the high pressure line 339a on the discharge end of the pilot operated reducing valve assembly 332 supplies high pressure to the control valves 333 and 334 through lines 357 and 358. The control valve 333 includes a port connected to one end of the weight transfer cylinder 111a through a line 359, a port connected to the other end of the cylinder through line 360, and a port connected to the return line 344 through line 361. Similarly, the control valve 334 includes a port connected to one end of the weight transfer cylinder 111b through a line 362, a port connected to the other end of the cylinder through the line 363 and a port connected to the return line 344 through the line 364. The control valves 333 and 334 are respectively three-position valves including straight or up positions 333u and 334u, block positions 333b and 334b, and cross or down positions 333d and 334d. When the control valves are in a straight or up position 333u and 334u, they respectively cause the pistons in the weight transfer cylinders to move up and apply weight transfer forces to the respective couplers. When the control valves are in the down positions, they correspondingly cause the pistons in the weight transfer cylinders to move downwardly and remove any weight transfer force from the couplers. The block positions are used to block the weight transfer cylinders in a suitable position whether that be up, down or intermediate, depending upon the needs of the tractor. For example, if full pressure will raise the coupler of a light rail car off its center pin, the valve would be moved to the block position with an intermediate pressure to prevent such action. The control valves 333 and 334 may be solenoid operated or manually operated as desired.

The pressure reducing valve assembly 332 functions to supply three different pressures to the weight control cylinders such as, for example, a maximum of 1,100 psi, an intermediate range of 800 psi and a minimum of 100 psi, depending upon the traction needs of the vehicle. The valve assembly 332 includes a pilot controlled pressure reducing valve 365, pilot relief valves 366 and 367, and a three-way solenoid operated control valve 368. The valve 365 includes an inlet pressure port connected to the high pressure line 339, an outlet pressure port connected to the high pressure supply line 339a feeding the control valves 333 and 334 of the weight transfer cylinders. The amount of pressure permitted through the pressure reducing valve 365 depends upon the position of the spool which is forced in one direction by a spring 365a and pilot pressure at the pilot port 365b, while pilot pressure is also directed to the other end of the spool through pilot port 365c. Pilot pressure is taken from the outlet port of the valve 365 but is orificed to the lower end of the spool through an orifice 365d. Reduction of the pilot pressure at port 365b decreases the amount of pressure available at the discharge line 339a and therefore the weight transfer force. The pilot pressure at port 365b is controlled by the position of a three-way control valve 368.

The three-position control valve 368 includes a straight position 368a, a block position 368b and a cross position 368c. The control valve 368 is solenoid operated by a signal generator 369 which responds to the traction needs or demands of the vehicle. The control valve 368 is in the block position 368b when no signal is applied to either solenoid of the valve, as illustrated in FIG. 24 wherein only the relief port or drain line of the pilot relief valve 367 is connected to tank 337 through the drain line 370 and return line 344, thereby causing the pilot pressure 365b to be set according to pilot relief valve 367 and the lower side of the spool in the pressure reducing valve 365 subjected to this pressure setting. Inasmuch as the pilot valve 367 has the highest pressure setting, for example, 1,100 psi, the pressure reducing valve 365 will cause the pressure in the high pressure line 339a leading to the control valves 333 and 334 and ultimately to one of the weight transfer cylinders to be at the highest possible setting and give maximum weight transfer force. When a signal is applied to the solenoid 368 to cause the straight position 368a to move to inlet and outlet ports of the valve, the drain line 371 of the pilot relief valve 366 is then connected to tank 337 through the return line 344, thereby causing the pilot pressure at port 365b to equal the setting of the pilot relief valve 366 which is set lower than pilot relief valve 367. This action will essentially bypass pilot relief valve 367. Assuming this is 800 psi, then that pressure will be supplied by the pressure reducing valve 365 to the high pressure line 339a and also to the weight transfer cylinder to reduce weight transfer force. In that event, the signal generator 369 applies a signal to the other solenoid of the valve 368 so that the cross position 368c is connected to the ports, the pilot port 365b of the pressure reducing valve 365 is then connected directly to tank 337 through line 372, thereby effectively bypassing both pilot relief valves 366 and 367, whereby the minimum pressure setting of the reducing valve in accordance with the spring 365a will supply the lowest pressure to the pressure line 339a and thereby provide the lowest amount of weight transfer at a weight transfer cylinder. Thus, the control valve 368 adjusts the pilot pressure to pilot ports 365b in response to the signal generator 369 which, in turn, responds to the traction demands to vary the weight transfer forces. The solenoid of valves 368 function as a signal receiving means connected to the signal generator 369.

During application of a weight transfer force through one of the weight transfer cylinders, a relief valve 373 having an inlet connected to the high pressure supply line 339a through the line 357 and its outlet connected to the return line 344 through a drain line 373a responding to a spring force produced by a spring 373b and the pilot pressure through pilot port 373c relieves any pressure in the weight transfer cylinder in excess of the set pressure as established by the pilot operated reducing valve 332 such as when the tractor and rail cars might pass over a rough section of railway track. Accordingly, the relief valve 373 avoids possible damage to the rail car moving vehicle or rail car by preventing excessive weight transfer forces from being applied to the weight transfer coupler.

As previously noted, one of the important features of the present invention concerns the ability of the shock absorbers to offset spring depression and maintain the springs in an active and functioning condition even though the vehicle is under the influence of increased loading, such as, for example, occurs when the weight of the rail car coupled thereto is transferred to the vehicle for the purpose of increasing the traction between the rear wheels and railway track. In the illustrated embodiment, this function is achieved through the portion of the hydraulic circuit 331 which will now be described in detail. Since the systems are identical for both the front and rear spring and shock absorber systems, the description will concern itself only with an explanation of the construction and operation of the front system, namely, that associated with the weight transfer coupler 111a, however, like reference numerals have been applied to like components associated with the rear weight transfer coupler cylinder 111a.

Referring to FIG. 24, it will be noted that the supply line 359 which feeds high pressure fluid to the front weight transfer coupler cylinder 111a for the purpose of raising the coupler associated therewith is connected to a branched supply line 375 which communicates with a control valve 376. As shown, control valve 376 is a two-position four-port valve which includes a cross position designated by the reference numeral 376a and a block position designated by the reference numeral 376b. In the cross position supply lines 377 and 378 respectively communicate with the cap side of the two front shock absorbers designed in the FIG. 24 schematic by the reference numerals 116a and 116b. As shown, the lines 377 and 378 are provided with a flow restriction orifice 379 and 380 respectively. In this manner, the supply of high pressure fluid from the line 359 into the rod side of the front weight transfer coupler 111a will result in the simultaneous transmission of the fluid to the cap side of the front shock absorber cylinders 116a and 116b. The rod sides of each of these cylinders respectively communicate with a line 381 which, in turn, is connected to a line 382 that feeds into a second control valve 383 also shown in the illustrated embodiment as being a two-position four-port valve. Line 381 includes a pair of directional flow restrictors 384 and 385 which respectively function to provide restricted flow in the line 381 in a direction away from the rod side of the shock absorber cylinders 116a and 116b and free flow through the line 381 in the direction towards the front shock absorber cylinders 116a and 116b. Additionally, it will be noted that a cross line 386 interconnects the cap side of each of the shock absorber cylinders 116a and 116b with the supply tank 337. It should be noted that for purpose of convenience and clarity four separate supply tanks have been shown at various locations in FIG. 24, each of such tanks, however, has been identified by the same reference numeral, namely "337", since, in practice, only one such supply tank would be employed. As shown, a line 386 is provided with a pair of check valves 388 and 389 which respectively function to preclude the passage of fluid from the cap side of the cylinders 116a and 116b through line 386 into tank 387.

Control valve 383, as noted, is a two-position four-port type which includes a cross position 383a in which lines 382 from the hydraulic circuit associated with the front and rear shock absorbers are placed in communication with a fluid tank 337 through a branched connecting line 391.

Pressure relief from the front weight transfer coupler cylinder 111a and the cap side of the front shock absorber cylinders 116a and 116b is effected by the use of an accumulator tank 392 which communicates with the supply line 359 and the branched supply line 375 as shown. Correspondingly, pressure relief with respect to the rod sides of the front shock absorber cylinders 116a and 116b is achieved by the communication thereof with the supply tank 337 through the directional flow restriction valves 384 and 385 and line 381, the line 382, and the control valve 383 when such valve is in the cross position as shown.

In operation, the supply of high pressure fluid to the rod side of the front weight transfer cylinder 111b will result in the simultaneous delivery of the fluid to the cap side of the front shock absorber cylinders 116a and 116b when the control valve 376 is in the position 376a. This will result in the transmission of a force to the piston in the front shock absorber cylinders 116a and 116b which will serve to offset spring depression induced by reason of the increased load placed upon the support springs of the vehicle. As the vehicle travels along a railway track, the control valve 376 and control valve 383 are maintained in the cross positions so that in the functioning of shock absorbers, as the respective pistons thereof are urged upwardly in the cylinder, fluid from the cylinders will be transmitted to the accumulator tank 392 through the lines associated therewith. In this regard, it should be noted that flow of the fluid to the tank 337 is precluded by reason of the check valves 388 and 389. In this connection, it should be noted that the various lines associated with each of the shock absorber cylinder ports provide restricted flow in the direction away from the cylinders and free flow in the direction towards the cylinders. Free flow, for example, into the cap sides of the hydraulic cylinders being achieved through the line 386 from the supply tank 337 and free flow into the rod sides of such cylinders being achieved through the line 381 from fluid received from the supply tank 337.

If desired, the combined piston area on the cap side of the shock absorber cylinders 116a and 116b can be sized to be approximately equal to the piston area on the rod side of the front weight transfer coupler cylinder 111b so that a substantially equal force will be applied to the front shock absorbers as is applied to the weight transfer cylinder. Accordingly, it will be appreciated that this aspect of the hydraulic circuit of the present invention enables the springs to be maintained in an active condition even when the vehicle is under the influence of substantial weight transfer forces, thereby enabling such vehicles to travel on rails at substantially higher speeds than are otherwise achieveable in view of the fact that the springs will serve to keep the rear wheels on the track even in instances wherein the tracks have been poorly maintained, thereby providing the vehicle improved rail travel stability.

As previously noted, another important aspect of the present invention concerns the feature of enabling the operator to selectively maintain the respective differential axles in fixed relation to the frame when the vehicle is in a road wheel mode operation. This feature provides significant benefits which materially enhance the operation of the vehicle. For example, it enables the rotational axes of the driving hubs 121 and 122 to be maintained in fixed relationship with the rotational axes of the driven wheels. Thus, shifting of the driving hubs on the periphery of the driven road wheel tires 41 and 42 is eliminated and increased frictional contact between the driving surface of the driving hubs and the tread portion of the road wheels is achieved. Additionally, this feature of the present invention also serves to lock both the axles 69 and 75 and the rail wheels associated therewith in an up position, keeping them from dropping when the vehicle is supported wholly on the road wheels and thereby providing the vehicle with improved road clearance.

These advantageous features are achieved by locking the pistons of the front and rear shock absorbers in fixed relationship with the cylinders thereof. In the illustrated embodiment, this is achieved hydraulically by placing the front shock absorber control valve 376 in the blocked position 376b and the control valve 383 in the blocked position indicated by the reference numeral 383b. Correspondingly, the control valve associated with the rear weight transfer coupler cylinder and rear shock absorbers also identified by the reference numeral 376 is also placed in its blocked position 376b. In this manner, fluid flow from the cap side of the front shock absorber cylinders 116a and 116b is blocked via the valve 376b closing off the lines 377 and 378 and the check valve 388 precluding passage of fluid therefrom through the line 386. Similarly, the blocked position 383b of valve 383 serves to preclude the passage of fluid from the rod sides of the front shock absorber cylinders 116a and 116b as well as the rod sides of the rear shock absorber cylinders also designated by the reference numerals 116a and 116b.

It will be apparent to those skilled in this art that the present invention and various aspects thereof can be embodied in other forms of traction vehicles and that the modifications and variations therefrom can be made without departing from the spirit and scope of this invention. Accordingly, this invention is to be construed and limited only by the scope of the appended claims.

We claim:

1. A railway car moving vehicle having couplers at opposite ends of said vehicle enabling said vehicle to be coupled to railway cars at each end of said vehicle for moving said railway cars along a railway track, said vehicle comprising: a frame; wheels mounted to said vehicle for supporting said vehicle on railway tracks; means for driving said wheels; a cab mounted to said frame, said cab extending transversely across said vehicle with respect to the direction of travel thereof, said cab including dual driving stations on opposite sides thereof from which an operator can view the fore and aft directions of travel of said vehicle; a console mounted in said cab between said dual driving stations, said console having a control panel thereon which control panel includes a set of vehicle operation controls, said console being pivotably mounted in said cab for swinging movement about a generally fixed vertical axis in said cab for orienting said control panel into positions generally accessible to a vehicle operator located in each of said dual driving stations; whereby, the operator of said vehicle during the travel thereof on railway tracks is able to selectively operate said vehicle through a single set of vehicle operation controls from each of said dual driving stations to thereby position himself for maximum visibility irrespective of the direction of travel of said vehicle.

2. The railway car moving vehicle of claim 1 wherein means is provided for locking said console into said positions.

* * * * *

UNITED STATES PATENT AND TRADEMARK OFFICE
CERTIFICATE OF CORRECTION

PATENT NO. : 4,155,309
DATED : May 22, 1979
INVENTOR(S) : Victor H. Ames et al.

It is certified that error appears in the above-identified patent and that said Letters Patent are hereby corrected as shown below:

In the Abstract, line 22, "controlsto" should read --controls to--

Column 2, line 67, "shaft" should read --shift--

Column 19, line 25, "designed" should read --designated--

Signed and Sealed this

Eighth Day of April 1980

[SEAL]

Attest:

SIDNEY A. DIAMOND

Attesting Officer

Commissioner of Patents and Trademarks